United States Patent
Perlman et al.

(10) Patent No.: US 9,015,775 B2
(45) Date of Patent: Apr. 21, 2015

(54) SYSTEM AND METHOD FOR INTERFACING A PORTABLE MEDIA DEVICE WITH A VEHICLE INFORMATION SYSTEM

(75) Inventors: Marshal H. Perlman, Portola Hills, CA (US); Mehdi Izadyar, Trabuco Canyon, CA (US); Paul Anthony Margis, Irvine, CA (US); Christopher Brian Lundquist, Snohomish, WA (US); Steven Lee Sizelove, Woodinville, WA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 1131 days.

(21) Appl. No.: 12/210,624

(22) Filed: Sep. 15, 2008

(65) Prior Publication Data

US 2009/0119721 A1 May 7, 2009

Related U.S. Application Data

(60) Provisional application No. 60/972,460, filed on Sep. 14, 2007.

(51) Int. Cl.
H04N 7/18 (2006.01)
H04N 21/4363 (2011.01)
(Continued)

(52) U.S. Cl.
CPC .......... *H04N 21/43632* (2013.01); *H04N 7/24* (2013.01); *H04N 21/2146* (2013.01); *H04N 21/4122* (2013.01); *H04N 21/4126* (2013.01); *H04N 21/41422* (2013.01)

(58) Field of Classification Search
USPC ...................................... 725/74–85
See application file for complete search history.

(56) References Cited

U.S. PATENT DOCUMENTS 3,037,812 A 6/1962 Monroe
4,584,603 A 4/1986 Harrison
(Continued)

FOREIGN PATENT DOCUMENTS

CN 1104160 A 6/1995
CN 200520103236.4 12/2006
(Continued)

OTHER PUBLICATIONS

US, Office Action, U.S. Appl. No. 10/773,523, Oct. 5, 2006.
(Continued)

*Primary Examiner* — Yassin Alata
(74) *Attorney, Agent, or Firm* — Orrick, Herrington & Sutcliffe, LLP

(57) ABSTRACT

An information system suitable for use in cooperation with portable media devices, such as an Apple iPod® digital electronic media device, and methods for manufacturing and using same. The information system provides a user-friendly communication interface for coupling with a portable media device and can perform a plurality of integration tasks simultaneously, enabling the personal media device to become fully integrated with the information system. Viewing content thereby can be selected from video and/or audio viewing content stored internally within the personal media device, and the selected viewing content can be communicated from the personal media device to the information system for presentation via a video presentation system and/or an audio presentation system of the information system. The personal media device likewise can receive control commands and/or operating power from the information system. Thereby, the personal media device advantageously can become a seamless part of the information system.

39 Claims, 15 Drawing Sheets

(51) Int. Cl.
  *H04N 7/24* (2011.01)
  *H04N 21/214* (2011.01)
  *H04N 21/41* (2011.01)
  *H04N 21/414* (2011.01)

(56) References Cited

U.S. PATENT DOCUMENTS

| | | |
|---|---|---|
| 4,866,515 A | 9/1989 | Tagawa et al. |
| 4,897,714 A | 1/1990 | Ichise et al. |
| 5,177,616 A | 1/1993 | Riday |
| 5,295,089 A | 3/1994 | Ambasz |
| 5,311,302 A | 5/1994 | Berry et al. |
| 5,469,363 A | 11/1995 | Saliga |
| 5,555,466 A | 9/1996 | Scribner et al. |
| 5,568,484 A | 10/1996 | Margis |
| 5,596,647 A | 1/1997 | Wakai et al. |
| 5,617,331 A | 4/1997 | Wakai et al. |
| 5,640,002 A | 6/1997 | Ruppert et al. |
| 5,701,582 A | 12/1997 | DeBey |
| 5,709,448 A | 1/1998 | Jennings et al. |
| 5,760,819 A | 6/1998 | Sklar et al. |
| 5,790,175 A | 8/1998 | Sklar et al. |
| 5,790,787 A | 8/1998 | Scott et al. |
| 5,835,127 A | 11/1998 | Booth et al. |
| 5,857,869 A | 1/1999 | Parcel et al. |
| 5,889,268 A | 3/1999 | Swartz |
| 5,889,775 A | 3/1999 | Sawicz et al. |
| 5,953,429 A | 9/1999 | Wakai et al. |
| 5,959,596 A | 9/1999 | McCarten et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,058,288 A | 5/2000 | Reed et al. |
| 6,129,274 A | 10/2000 | Suzuki |
| 6,135,549 A | 10/2000 | Demick et al. |
| 6,151,497 A | 11/2000 | Yee et al. |
| 6,154,186 A | 11/2000 | Smith et al. |
| 6,177,887 B1 | 1/2001 | Jerome |
| 6,201,797 B1 | 3/2001 | Leuca et al. |
| 6,208,307 B1 | 3/2001 | Frisco et al. |
| 6,249,913 B1 | 6/2001 | Galipeau et al. |
| 6,338,045 B1 | 1/2002 | Pappas |
| 6,390,920 B1 | 5/2002 | Infiesto et al. |
| 6,487,540 B1 | 11/2002 | Smith et al. |
| 6,499,027 B1 | 12/2002 | Weinberger |
| 6,507,279 B2 | 1/2003 | Loof |
| 6,507,952 B1 | 1/2003 | Miller et al. |
| 6,519,693 B1 | 2/2003 | Debey |
| 6,529,706 B1 | 3/2003 | Mitchell |
| 6,549,754 B1 | 4/2003 | Miller et al. |
| 6,559,812 B1 | 5/2003 | McCarten et al. |
| 6,574,338 B1 | 6/2003 | Sachdev |
| 6,598,227 B1 | 7/2003 | Berry et al. |
| 6,600,418 B2 | 7/2003 | Francis et al. |
| 6,609,103 B1 | 8/2003 | Kolls |
| 6,622,124 B1 | 9/2003 | Kolls |
| 6,637,484 B1 | 10/2003 | Kraft |
| 6,643,510 B2 | 11/2003 | Taylor |
| 6,661,353 B1 | 12/2003 | Gopen |
| 6,693,236 B1 | 2/2004 | Gould et al. |
| 6,702,604 B1 | 3/2004 | Moscovitch |
| 6,736,315 B2 | 5/2004 | Swartz |
| 6,757,712 B1 | 6/2004 | Bastian et al. |
| 6,796,495 B2 | 9/2004 | Stahl et al. |
| 6,876,905 B2 | 4/2005 | Farley et al. |
| 6,899,390 B2 | 5/2005 | Sanfrod et al. |
| 6,990,338 B2 | 1/2006 | Miller et al. |
| 7,036,889 B2 | 5/2006 | Sanfrod et al. |
| 7,040,698 B2 * | 5/2006 | Park et al. ............... 297/217.3 |
| 7,100,187 B2 | 8/2006 | Pierzga et al. |
| 7,124,426 B1 | 10/2006 | Tsuria et al. |
| 7,177,638 B2 | 2/2007 | Funderburk et al. |
| 7,280,825 B2 | 10/2007 | Keen et al. |
| 7,360,833 B2 | 4/2008 | Vitito |
| 7,448,679 B2 | 11/2008 | Chang |
| 7,454,203 B2 | 11/2008 | Levitan |
| 7,483,696 B1 | 1/2009 | Mitchell |
| 7,496,361 B1 | 2/2009 | Mitchell et al. |
| 2002/0059363 A1 | 5/2002 | Katz et al. |
| 2002/0093564 A1 | 7/2002 | Israel |
| 2002/0094829 A1 | 7/2002 | Ritter |
| 2002/0095680 A1 | 7/2002 | Davidson |
| 2002/0152470 A1 | 10/2002 | Hammond |
| 2002/0178451 A1 | 11/2002 | Ficco |
| 2003/0003899 A1 | 1/2003 | Tashiro et al. |
| 2003/0107248 A1 | 6/2003 | Sanford et al. |
| 2003/0148736 A1 | 8/2003 | Wright et al. |
| 2003/0233658 A1 | 12/2003 | Keen et al. |
| 2004/0049797 A1 | 3/2004 | Salmonsen |
| 2004/0077308 A1 | 4/2004 | Sanford et al. |
| 2004/0078821 A1 | 4/2004 | Frisco et al. |
| 2004/0098745 A1 | 5/2004 | Marston et al. |
| 2004/0167967 A1 | 8/2004 | Bastian et al. |
| 2004/0183346 A1 | 9/2004 | Sanford et al. |
| 2005/0005298 A1 * | 1/2005 | Tranchina ............... 725/81 |
| 2005/0044564 A1 | 2/2005 | Stopniewicz |
| 2005/0047081 A1 | 3/2005 | LaPorte et al. |
| 2005/0111182 A1 | 5/2005 | Lin et al. |
| 2005/0132407 A1 | 6/2005 | Boyer, Jr. et al. |
| 2005/0177763 A1 | 8/2005 | Stoler |
| 2005/0193257 A1 | 9/2005 | Stoler |
| 2005/0202785 A1 | 9/2005 | Meyer |
| 2005/0216938 A1 | 9/2005 | Brady et al. |
| 2005/0239261 A1 | 10/2005 | Tai et al. |
| 2005/0242636 A1 | 11/2005 | Vitito |
| 2005/0242637 A1 | 11/2005 | Vitito |
| 2005/0242638 A1 | 11/2005 | Vitito |
| 2005/0256616 A1 | 11/2005 | Rhoads |
| 2005/0268319 A1 * | 12/2005 | Brady ............... 725/76 |
| 2005/0268320 A1 * | 12/2005 | Smith ............... 725/80 |
| 2006/0032979 A1 | 2/2006 | Mitchell et al. |
| 2006/0047426 A1 | 3/2006 | Vitito |
| 2006/0088001 A1 | 4/2006 | Reitmann et al. |
| 2006/0107295 A1 | 5/2006 | Margis |
| 2006/0119151 A1 | 6/2006 | Vitito |
| 2006/0174285 A1 | 8/2006 | Brady, Jr. et al. |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0270373 A1 | 11/2006 | So |
| 2006/0277589 A1 | 12/2006 | Margis et al. |
| 2006/0291803 A1 | 12/2006 | Watson et al. |
| 2006/0293190 A1 | 12/2006 | Watson et al. |
| 2007/0022018 A1 | 1/2007 | Suryanarayana et al. |
| 2007/0044126 A1 | 2/2007 | Mitchell |
| 2008/0023600 A1 | 1/2008 | Perlman |
| 2008/0040756 A1 | 2/2008 | Perlman et al. |
| 2008/0124054 A1 | 5/2008 | Bonar |
| 2008/0127278 A1 | 5/2008 | Bonar |
| 2009/0007193 A1 | 1/2009 | Correa et al. |
| 2009/0042651 A1 | 2/2009 | Prabhu et al. |

FOREIGN PATENT DOCUMENTS

| | | |
|---|---|---|
| EP | 0 577 054 B1 | 1/1994 |
| EP | 1 231 534 A1 | 8/2002 |
| JP | 58-46485 | 3/1983 |
| JP | 62-238693 | 10/1987 |
| JP | H06-285259 A | 10/1994 |
| JP | H09-512401 A | 11/1995 |
| JP | 2003-534959 A | 4/2000 |
| JP | 2003-140804 A | 5/2003 |
| JP | 2006-527540 A | 1/2005 |
| JP | 2005-045490 A | 2/2005 |
| JP | 2005-528030 A | 9/2005 |
| WO | WO 00/14987 A1 | 3/2000 |
| WO | WO 03/024110 A1 | 3/2003 |
| WO | WO 03/032503 A2 | 4/2003 |
| WO | WO 03/050000 A1 | 6/2003 |
| WO | WO 2004/003696 A2 | 1/2004 |
| WO | WO 2004/008277 A2 | 1/2004 |
| WO | WO 2005/120068 A3 | 12/2005 |

(56) References Cited

FOREIGN PATENT DOCUMENTS

| WO | WO 2006052941 A1 * | 5/2006 |
| WO | WO 2006/062641 A2 | 6/2006 |
| WO | WO 2006/065381 A2 | 6/2006 |

OTHER PUBLICATIONS

US, Office Action, U.S. Appl. No. 09/952,629, Mar. 14, 2006.
US, Office Action, U.S. Appl. No. 09/952,629, Dec. 1, 2006.
US, Office Action, U.S. Appl. No. 09/952,629, Jun. 27, 2007.
US, Office Action, U.S. Appl. No. 09/952,629, Oct. 27, 2008.
US, Office Action, U.S. Appl. No. 09/952,629, Mar. 18, 2008.
US, Office Action, U.S. Appl. No. 09/952,629, Jun. 2, 2009.
US, Office Action, U.S. Appl. No. 09/811,317, Feb. 28, 2002.
US, Office Action, U.S. Appl. No. 09/811,317, Aug. 13, 2002.
US, Office Action, U.S. Appl. No. 09/811,317, Dec. 30, 2002.
US, Notice of Allowance and Fees due, U.S. Appl. No. 09/811,317, Jul. 14, 2003.
US, Office Action, U.S. Appl. No. 08/863,448, Sep. 24, 1997.
US, Office Action, U.S. Appl. No. 08/863,448, Apr. 27, 1998.
US, Notice of Allowance, U.S. Appl. No. 08/863,448, Feb. 17, 1999.
US, Office Action, U.S. Appl. No. 08/479,654, Jan. 24, 1997.
US, Office Action, U.S. Appl. No. 08/479,654, Aug. 21, 1995.
US, Office Action, U.S. Appl. No. 08/479,654, Mar. 1, 1996.
US, Office Action, U.S. Appl. No. 08/479,654, Aug. 5, 1997.
US, Office Action, U.S. Appl. No. 08/071,218, Dec. 7, 1994.
US, Office Action, U.S. Appl. No. 08/071,218, Apr. 20, 1995.
US, Notice of Allowance and Fees due, U.S. Appl. No. 08/071,218, Aug. 7, 1995.
US, Office Action, U.S. Appl. No. 08/480,666, Feb. 9, 1996.
US, Notice of Allowance and Fees due, U.S. Appl. No. 08/480,666, Sep. 5, 1996.
US, Office Action, U.S. Appl. No. 08/480,666, Oct. 16, 1996.
US, Office Action, U.S. Appl. No. 08/480,666, Nov. 22, 1996.
JP, Office Action, 2004-199893, Jul. 5, 2005.
JP, Office Action, 2006-000840, Feb. 28, 2007.
US, Office Action, U.S. Appl. No. 08/363,228, Oct. 3, 1995.
US, Office Action, U.S. Appl. No. 08/363,228, Mar. 27, 1996.
US, Notice of Allowance and Fees due, U.S. Appl. No. 08/363,228, Apr. 9, 1996.
US, Office Action, U.S. Appl. No. 10/772,565, Mar. 4, 2009.
PCT, International Search Report, PCT/US2004/017666, Apr. 2, 2005.
EP, Communication, App. No. 04754296.4-1241, Apr. 4, 2007.
AU, First Report, App No. 2004251677, Sep. 26, 2008.
US, Office Action, U.S. Appl. No. 11/123,327, Dec. 11, 2008.
US, Office Action, U.S. Appl. No. 11/123,327, Oct. 14, 2009.
PCT, International Search Report, PCT/US2005/016513, Aug. 9, 2005.
PCT, International Preliminary Report, PCT/US2005/016513, Nov. 16, 2006.
EP, Communication, App. No. 05 749 692.9-1525, Jun. 15, 2007.
EP, Communication, App. No. 05 749 692.9-1525, Oct. 22, 2008.
US, Office Action, U.S. Appl. No. 11/154,749, Aug. 18, 2008.
US, Office Action, U.S. Appl. No. 11/154,749, Jan. 23, 2009.
PCT, International Search Report, PCT/US2005/021518, Jan. 3, 2006.
PCT, International Preliminary Report, PCT/US2005/021518, Jan. 4, 2007.
EP, Communication, App. No. 05 762 201.1-2202, May 18, 2007.
EP, Communication, App. No. 05 762 201.1-2202, Jul. 18, 2008.
US, Office Action, U.S. Appl. No. 11/269,378, Aug. 20, 2008.
US, Office Action, U.S. Appl. No. 11/269,378, Apr. 28, 2009.
PCT, International Search Report, PCT/US2005/040380, Mar. 15, 2006.
PCT, International Preliminary Report, PCT/US2005/040380, May 18, 2007.
US, Office Action, U.S. Appl. No. 11/277,896, Apr. 14, 2009.
PCT, International Search Report, PCT/US2006/012067, Aug. 9, 2006.
PCT, International Preliminary Report, PCT/US2006/012067, Oct. 11, 2007.
EP, Communication, App. No. 06 740 274.3-2416, Jan. 31, 2008.
EP, Communication, App. No. 06 740 274.3-2416, Sep. 17, 2008.
EP, Notice of Intention to Grant, App. No. 06 740 274.3-2416, Mar. 20, 2009.
US, Office Action, U.S. Appl. No. 11/379,360, Apr. 3, 2009.
PCT, International Search Report, PCT/US2006/014852, Dec. 4, 2006.
PCT, International Preliminary Report, PCT/US2006-014852, Nov. 1, 2007.
PCT, International Search Report, PCT/US2007/074367, Dec. 17, 2007.
PCT, International Preliminary Report, PCT/US2007/074367, Feb. 5, 2009.
EP, Communication, App. No. 07 813 357.6-1523, Sep. 29, 2009.
PCT, International Search Report, PCT/US2007/075448, Jul. 4, 2008.
PCT, International Search Report, PCT/US2008/076285, Dec. 30, 2008.
PCT, International Search Report, PCT/US2008/076290, Jan. 30, 2009.
PCT, International Search Report, PCT/US2008/076294, Dec. 29, 2008.
Y.F. Chen, et al., "Personalized Multimedia Services Using a Mobile Service Platform", IEEE 2002, pp. 918-215.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgang Nr. Mar. 2000, pp. 100-105.
Ibenthal A. et al: Multimedia Im Fahrzeug: Dienste Und Technek, Mar. 2000, Fernseh Und Kinotechnik, Vde Verlad GMBH. Berlin, De, pp. 100-105, XP000966339 ISSN: 0015-014.
Chen Y. et al., Personalized Multimedia Services Using a Mobile Service Platform, 2002 IEEE, 0-7803-7376-6/02, Mar. 17, 2002, pp. 918-925.
Gratschew, S., et al., A Multimedia Messaging Platform for Content Delivering, 2003 IEEE, 0-7803-7661-7/03, Feb. 23, 2003, pp. 431-435.
US, Office Action, U.S. Appl. No. 10/772,565, Jan. 4, 2011.
US, Office Action, U.S. Appl. No. 10/772,565, Jul. 7, 2010.
US, Office Action, U.S. Appl. No. 10/772,565, Nov. 24, 2009.
US, Notice of Allowance and Fees Due, U.S. Appl. No. 11/277,896, Oct. 23, 2009.
US, Office Action, U.S. Appl. No. 11/123,327, Jul. 20, 2010.
US, Office Action, U.S. Appl. No. 11/154,749, Oct. 26, 2009.
US, Notice of Allowance and Fees Due, U.S. Appl. No. 11/154,749, Feb. 17, 2011.
US, Office Action, U.S. Appl. No. 11/154,749, Jun. 7, 2010.
US, Office Action, U.S. Appl. No. 11/379,360, Aug. 25, 2010.
US, Office Action, U.S. Appl. No. 11/379,360, Nov. 23, 2009.
US, Office Action, U.S. Appl. No. 11/828,193, Nov. 30, 2009.
CN, Office Action, Appl. No. 200780029616.X, Aug. 6, 2010.
EP, Office Action, EP Application No. 08 830 787.1, Dec. 9, 2011.
KR, Office Action, Sep. 16, 2011.
CN, Chinese Office Action, Application No. 200880107132.7, Jul. 22, 2011.
CN, Office Action, CN Appln No. 200880115267.8, Jul. 8, 2013.
CN, Office Action, Chinese Application No. 200780029616.X, Nov. 2, 2012.
JP, Office Action, Japanese Application No. 2010-525043, May 7, 2013.
CN, Office Action, Chinese Application No. 200801071327, Jun. 7, 2013.
JP, Office Action, Japanese Application No. 2009-523977, Jul. 17, 2012.
CN, Office Action, CN Appln No. 200880115267.8, Dec. 24, 2012.
JP, Office Action, JP Appln No. 2010-525047, Dec. 25, 2012.
EP, EP Exam Report, EP Appln No. 05823171.3, Feb. 6, 2013.
JP, Office Action, JP Appln No. 2010-525045, Mar. 5, 2013.
JP, Office Action, JP Appln No. 2010-525046, Mar. 5, 2013.
CN, Office Action, CN Appln No. 20880107089.4, Mar. 7, 2013.
CN, Office Action, CN Appln No. 200780029616.X, Apr. 17, 2013.
JP, Office Action, JP Appln No. 2010-525043, May 7, 2013.

* cited by examiner

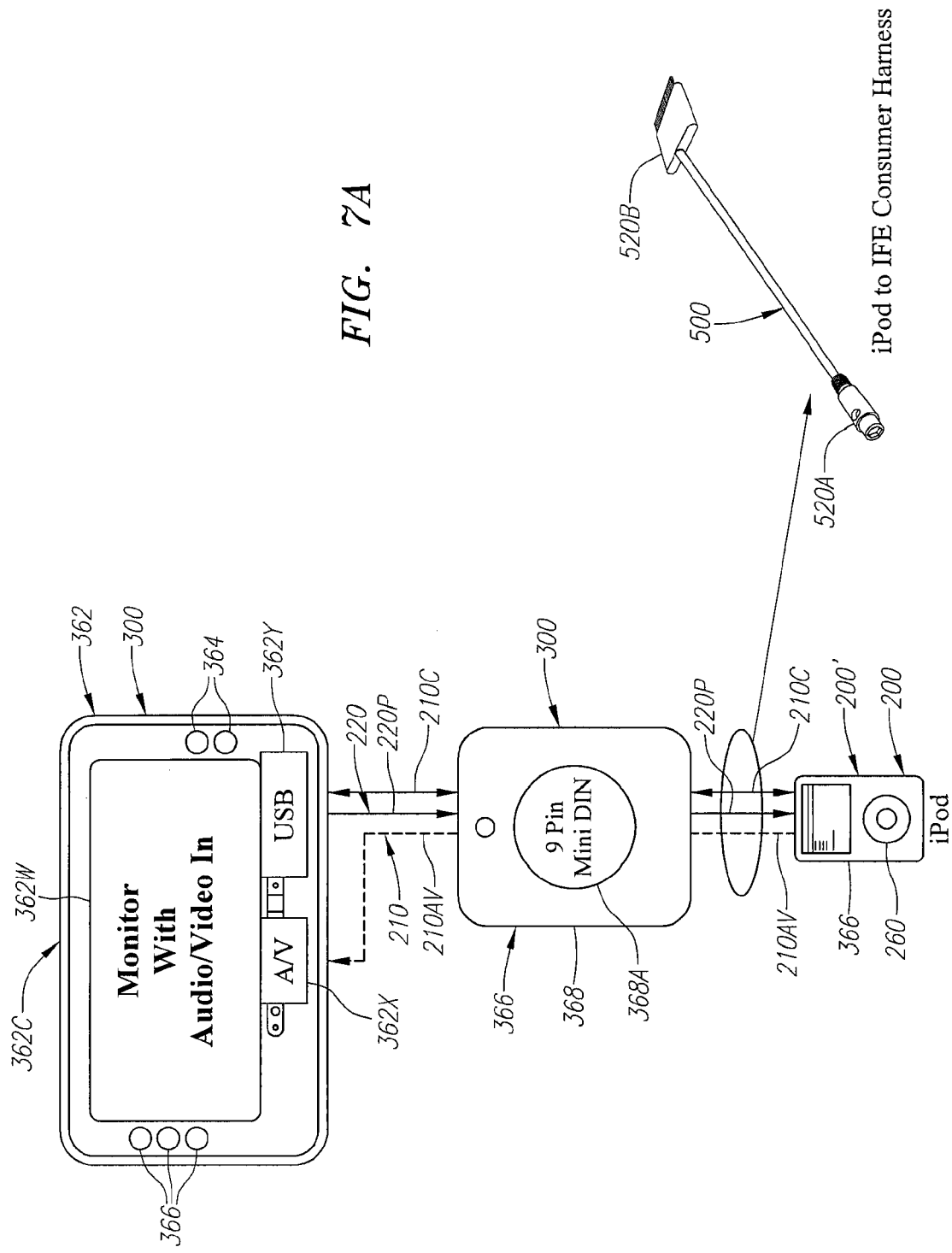

SYSTEM AND METHOD FOR INTERFACING A PORTABLE MEDIA DEVICE WITH A VEHICLE INFORMATION SYSTEM

CROSS-REFERENCE TO RELATED APPLICATIONS

This application claims priority to U.S. provisional patent application Ser. No. 60/972,460, filed on Sep. 14, 2007. Priority to the provisional patent application is expressly claimed, and the disclosure of the provisional application is hereby incorporated herein by reference in its entirety and for all purposes.

CROSS-REFERENCE TO RELATED NONPROVISIONAL APPLICATIONS

The following United States nonprovisional patent applications are fully owned by the assignee of the present application and are filed on the same date herewith. The disclosure of the nonprovisional patent applications are hereby incorporated herein by reference in their entireties and for all purposes:

"MEDIA DEVICE INTERFACE SYSTEM AND METHOD FOR VEHICLE INFORMATION SYSTEMS," Ser. No. 12/210,636, filed Sep. 15, 2008;

"MEDIA DEVICE INTERFACE SYSTEM AND METHOD FOR VEHICLE INFORMATION SYSTEMS," Ser. No. 12/210,652, filed Sep. 15, 2008; and "PORTABLE USER CONTROL DEVICE AND METHOD FOR VEHICLE INFORMATION SYSTEMS," Ser. No. 12/210,689, filed Sep. 15, 2008.

FIELD

The present disclosure relates generally to interface systems and more particularly, but not exclusively, to systems suitable for interfacing personal media devices with vehicle information systems installed aboard passenger vehicles.

BACKGROUND

Vehicles, such as automobiles and aircraft, often include vehicle information systems for satisfying passenger demand for access to viewing content, such as entertainment, information content, or other viewing content, while traveling.

Conventional passenger information (or entertainment) systems typically include overhead cabin video systems or seat-based video systems with individual controls such that viewing content is selectable by the passengers. The viewing content can include audio and video content that is derived from a variety of content sources. Prerecorded viewing content, such as motion pictures and music, can be provided by internal content sources, such as audio and video players, that are installed aboard the vehicle. The conventional passenger information systems likewise can include an antenna system for receiving viewing content, such as live television programming and/or Internet content, transmitted from one or more content providers (or sources) that are external to, and/or remote from, the vehicle.

Such conventional passenger information systems, however, suffer from numerous disadvantages. Some passengers find the passenger information systems to be complicated to operate and the viewing content difficult to enjoy. Selection of the viewing content, for example, can prove difficult due to the awkward placement and operation of the user controls. Similarly, the video systems of the passenger information systems typically are located distally from the passenger controls, such as overhead and/or on an opposing seatback. In addition, some or all of the passengers traveling aboard the vehicle can be inhibited from enjoying the viewing content if one or more of the video systems fails. Conventional passenger information systems further require a plurality of interface points and multiple cables, such as left audio, right audio, video, data, and/or power, for communicating with passengers' handheld personal media devices and do not support remote control for these personal media devices. Such system shortcomings are a frequent source of passenger complaints during travel.

Further, passenger demand for viewing content is continually evolving. Not only do passengers want to access the most current viewing content, such as live television programming and the latest games, but they also require a more extensive selection of information products and services, such as Internet access and in-transit shopping, to be available. Passengers likewise wish to view their own personally-provided viewing content, such as photo albums and/or music selections, during travel. Conventional passenger information systems, however, are limited by their fixed hardware technology and cannot easily be adapted to accommodate changing passenger viewing content and other information preferences.

In view of the foregoing, a need exists for an improved passenger information system and method for integrating passengers' personal media devices into the passenger information system in an effort to overcome the aforementioned obstacles and deficiencies of conventional passenger information systems.

BRIEF DESCRIPTION OF THE DRAWINGS

FIG. 7A is an exemplary detail drawing illustrating an embodiment of the vehicle information system of FIGS. 4A-B, wherein the vehicle information system is in communication with the personal media device via the communication cable assembly of FIGS. 5A-B.

Figure 1:
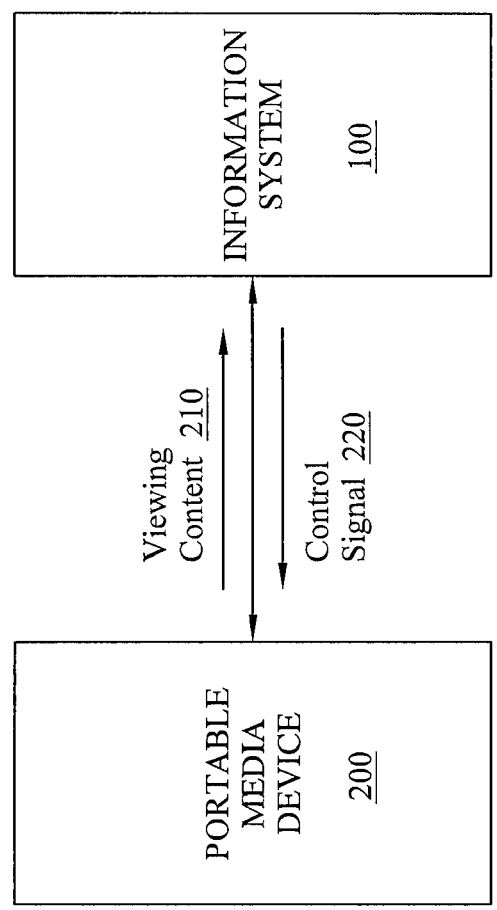
FIG. 1 is an exemplary top-level drawing illustrating an embodiment of an interface system for interfacing a personal media device with an information system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available passenger information systems are complicated to operate, limited by fixed hardware technology, and cannot easily be adapted to accommodate changing passenger viewing content and other information preferences, an information system that includes at least one communication interface for enabling communication with a personal media device can prove desirable and provide a basis for a wide range of system applications, such as vehicle information systems for use aboard automobiles, aircraft, and other types of vehicles during travel. This result can be achieved, according to one embodiment disclosed herein, by an information system 100 as illustrated in FIG. 1.

Turning to FIG. 1, the information system 100 is shown as being configured for use with a personal (or portable) media device 200. The information system 100 supports a simple manner for permitting the personal media device 200 to be integrated with the information system 100 using a user-friendly communication interface. Unlike conventional information systems that provide simple audio and video input jacks, the information system 100 can perform a plurality of integration tasks simultaneously, enabling the personal media device 200 to become fully integrated with the information system 100. Viewing content 210 thereby can be selected from audio and/or video viewing content stored internally within the personal media device 200 and can be communicated from the personal media device 200 to the information system 100 for presentation via a video presentation system 362 (shown in FIGS. 4A-B) and/or an audio presentation system 364 (shown in FIGS. 4A-B) of the information system 100. The personal media device 200 likewise can exchange control signals (or commands) 220, such as user control signals (or user control instructions) 230 (shown in FIGS. 4A-B), with, and/or receive operating power 220P (shown in FIGS. 7A-B) from, the information system 100. Thereby, the personal media device 200 advantageously can become a seamless part of the information system 100.

The personal media device 200 can store the audio and/or video viewing content 210 and can be provided as a handheld device, such as a laptop computer, a palmtop computer, a personal digital assistant (PDA), cellular telephone, and/or a MPEG Audio Layer 3 (MP3) device. Illustrative personal media devices 200 are shown and described in the co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which are assigned to the assignee of the present application and the respective disclosures of which are hereby incorporated herein by reference in their entireties. Preferably, the personal media device 200 is provided as an iPod® digital electronic media device and/or an iPhone® digital electronic media device each as manufactured by Apple Computer, Inc., of Cupertino, Calif.

The viewing content 210 can comprise any conventional type of audio and/or video viewing content, such as stored (or time-delayed) viewing content and/or live (or real-time) viewing content, in the manner set forth in the above-referenced co-pending U.S. patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. Exemplary viewing content 210 can include television programming content, music content, podcast content, photograph album content, audiobook content, and/or movie content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. Alternatively, and/or additionally, to entertainment content, such as live satellite television programming and/or live satellite radio programming, the viewing content likewise can include two-way communications, such as real-time access to the Internet 310C (shown in FIG. 2B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety. It is understood that the exemplary viewing content as shown and described herein are not exhaustive and are provided herein for purposes of illustration only and not for purposes of limitation.

Figure 2A:
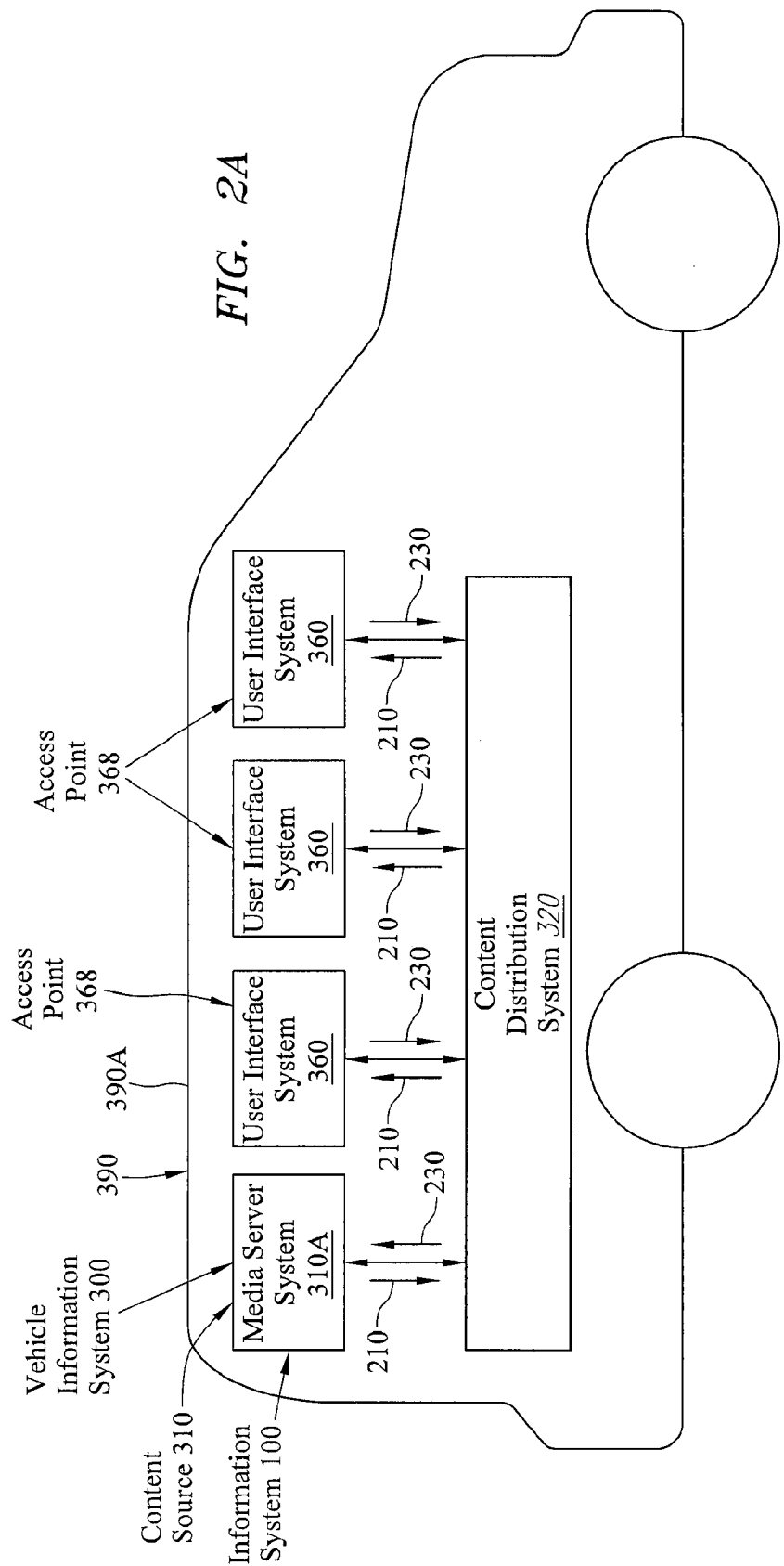
FIG. 2A is an exemplary top-level drawing illustrating the information system of FIG. 1, wherein the information system comprises a vehicle information system installed aboard an automobile.
Figure 2B:
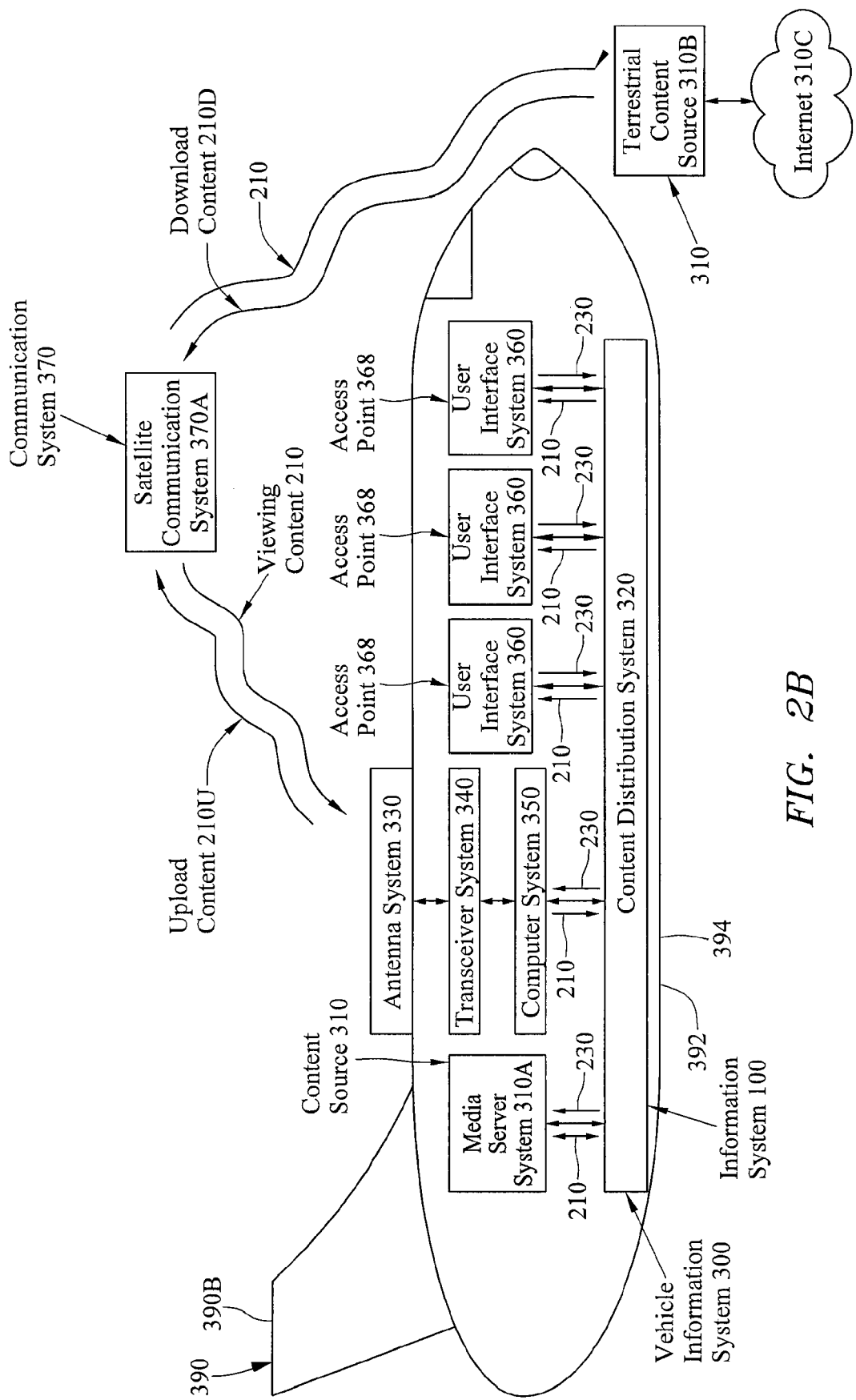
FIG. 2B is an exemplary top-level drawing illustrating the vehicle information system of FIG. 2A, wherein the vehicle information system is installed aboard an aircraft.

Although the information system 100 can be disposed in a fixed location, such as a building, the information system 100 likewise can advantageously be applied in portable system applications. Turning to FIGS. 2A-B, the information system 100 is shown as comprising a vehicle information system 300 that can be configured for installation aboard a wide variety of vehicles 390. Exemplary types of vehicles can include an automobile 390A (shown in FIG. 2A), an aircraft 390B (shown in FIG. 2B), a bus, a recreational vehicle, a boat, and/or a locomotive, or any other type of passenger vehicle without limitation. If installed on an aircraft 390B as illustrated in FIG. 2B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 2A-B, the vehicle information system 300 comprises at least one conventional content source 310 and one or more user (or passenger) interface systems 360 that communicate via a real-time content distribution system 320. Each content source 310 can be provided in the manner set forth in the co-pending U.S. patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which are assigned to the assignee of the present application and the respective disclosures of which are hereby incorporated herein by reference in their entireties.

The content sources 310 can include one or more internal content sources, such as server system 310A, that are installed aboard the vehicle 390 and/or remote (or terrestrial) content sources 310B that can be external from the vehicle 390. The server system 310A can be provided as an information system controller for providing overall system control functions for the vehicle information system 300 and/or at least one media (or file) server system, as illustrated in FIGS. 2A-B), for storing preprogrammed content and/or downloaded viewing content 210D, as desired. The server system 310A can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the downloaded viewing content 210D.

Being configured to distribute and/or present the viewing content 210 provided by one or more selected content sources 310, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370, such as a satellite communication system 370A. The vehicle information system 300 thereby can receive download viewing content 210D from a selected terrestrial content source 310B and/or transmit upload viewing content 210U, including navigation and other control instructions, to the terrestrial content source 310B. As desired, the terrestrial content source 310B can be configured to communicate with other terrestrial content sources (not shown). The terrestrial content source 310B is shown in FIG. 2B as providing access to the Internet 310C. Although shown and described as comprising the satellite communication system 370A for purposes of illustration, it is understood that the communication system 370 can comprise any conventional type of wireless communication system, such as a cellular communication system (not shown) and/or an Aircraft Ground Information System (AGIS) communication system (not shown).

To facilitate communications with the terrestrial content sources 310B, the vehicle information system 300 can include an antenna system 330 and a transceiver system 340 for receiving the viewing content from the remote (or terrestrial) content sources 310B as shown in FIGS. 2A-B. The antenna system 330 preferably is disposed outside the vehicle 390, such as an exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media server system 310A and/or to one or more of the user interfaces 360, as desired. Although shown and described as being separate systems for purposes of illustration, the computer system 350 and the media server system 310A can be at least partially integrated.

Figure 3:
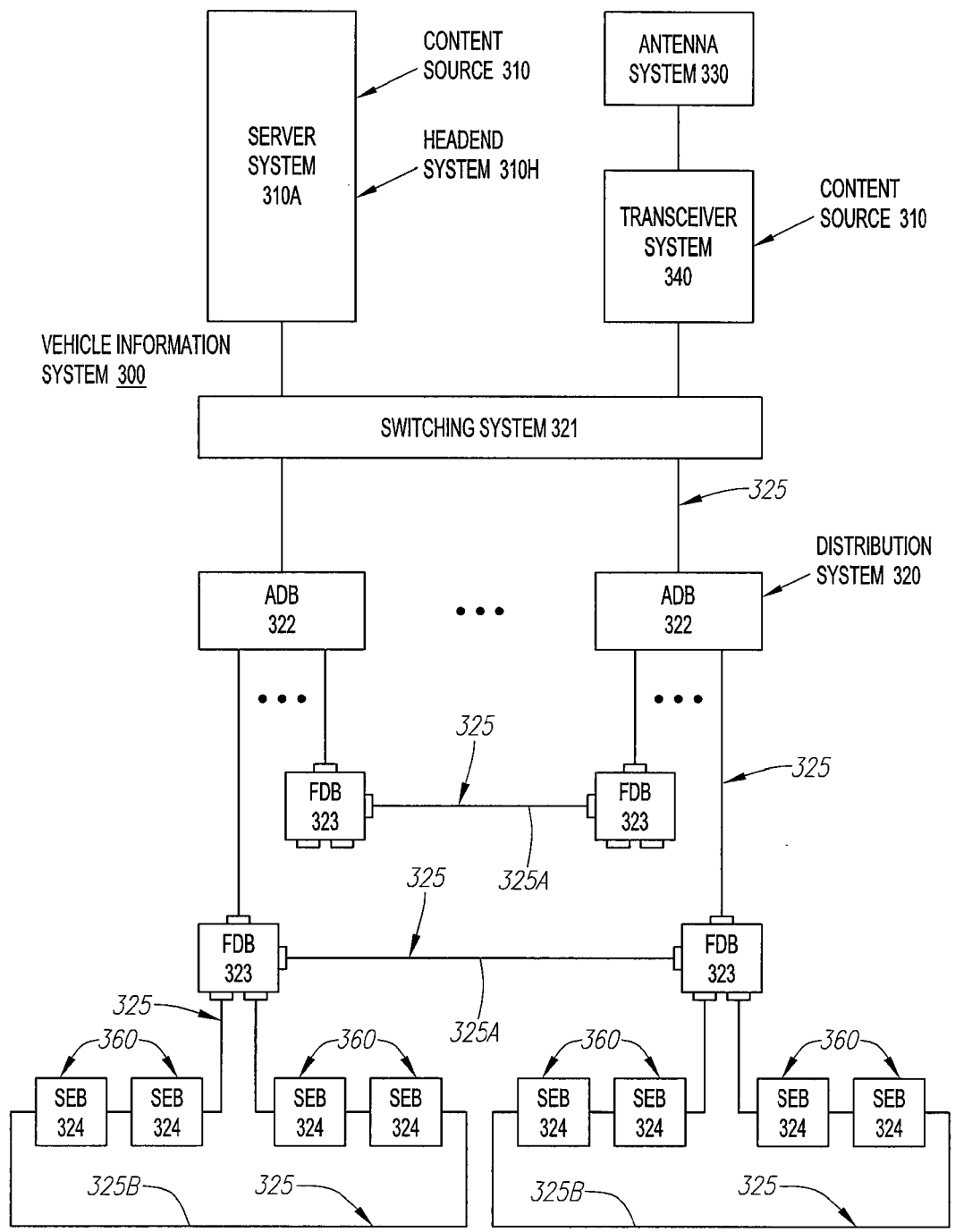
FIG. 3 is an exemplary detail drawing illustrating one preferred embodiment of a distribution system for the vehicle information systems of FIGS. 2A-B.

The vehicle information system elements, including the content sources 310 and the user interface systems 360, are shown in FIGS. 2A-B as communicating via the content distribution system 320. FIG. 3 illustrates an exemplary content distribution system 320 for the vehicle information system 300. The content distribution system 320 of FIG. 3 couples, and supports communication between a headend system 310H, which includes the content sources 310, and the plurality of user interface systems 360. The distribution system 320 as shown in FIG. 3 is provided in the manner set forth co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties.

As desired, the distribution system 320 likewise can include a network management system (not shown) provided in the manner set forth in co-pending U.S. patent applications, entitled "SYSTEM AND METHOD FOR IMPROVING NETWORK RELIABILITY," Ser. No. 10/773,523, filed on Feb. 6, 2004, and entitled "SYSTEM AND METHOD FOR IMPROVING NETWORK RELIABILITY," Ser. No. 11/086,510, filed on Mar. 21, 2005, which are assigned to the assignee of the present application and the respective disclosures of which are hereby incorporated herein by reference in their entireties.

As illustrated in FIG. 3, the distribution system 320 can be provided as a plurality of area distribution boxes (ADBs) 322, a plurality of floor disconnect boxes (FDBs) 323, and a plurality of seat electronics boxes (SEBs) (and/or premium seat electronics boxes (PSEBs)) 324 being configured to communicate in real time via a plurality of wired and/or wireless communication connections 325. The distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 3. Each floor disconnect box 323 is coupled with, and services, a plurality of daisy-chains of seat electronics boxes 324. The seat electronics boxes 324, in turn, are configured to communicate with the user interface systems 360. Each seat electronics box 324 can support one or more of the user interface systems 360.

As desired, the floor disconnect boxes 323 advantageously can be provided as routing systems and/or interconnected in the manner set forth in the above-referenced co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last seat electronics box 324 in each daisy-chain of seat electronics boxes 324 for a selected floor disconnect box 323 as shown in FIG. 3. Each SEB loopback connection 325B therefore forms a loopback path among the daisy-chained seat electronics boxes 324 coupled with the relevant floor disconnect box 323.

Returning to FIGS. 2A-B, the user interface systems 360 are provided for selecting viewing content 210 and for presenting the selected viewing content 210. As desired, the user interface systems 360 can comprise conventional passenger interfaces and can be provided in the manner set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005, as well as in the manner set forth in the co-pending U.S. patent application, entitled "SYSTEM AND METHOD FOR PRESENTING HIGH-QUALITY VIDEO TO PASSENGERS ON A MOBILE PLATFORM," Ser. No. 60/673,171, filed on Apr. 19, 2005, the disclosure of which is hereby incorporated herein by reference in its entirety.

Figure 4A:
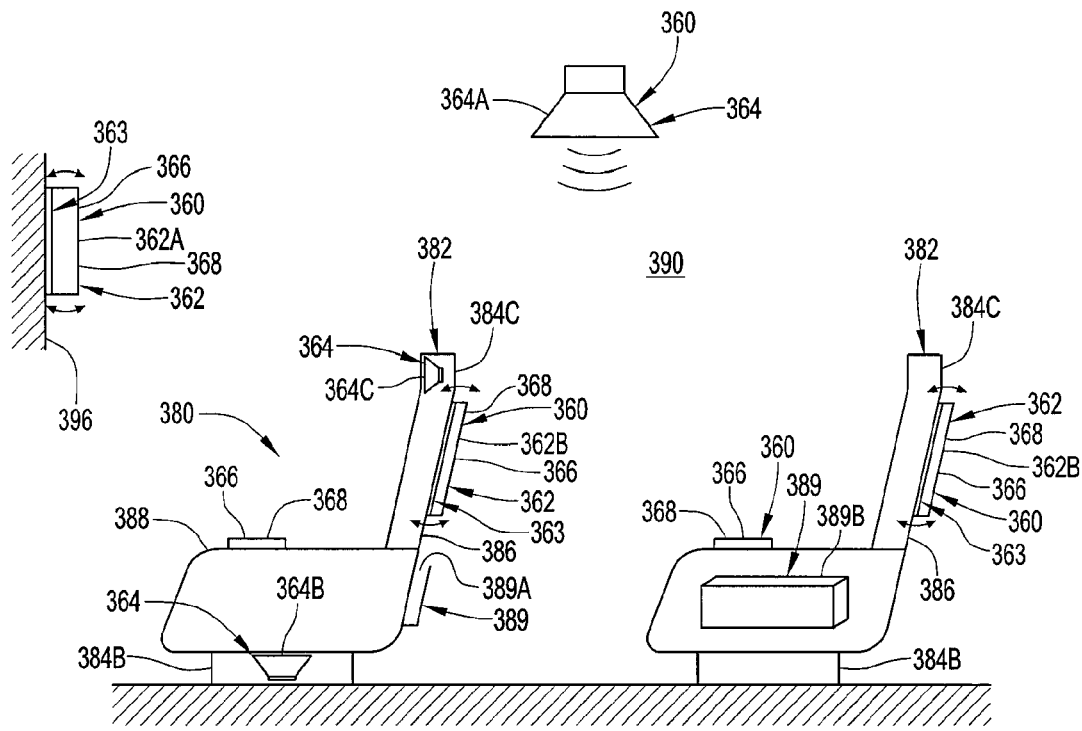
FIG. 4A is an exemplary top-level drawing illustrating a passenger cabin of a vehicle, wherein the vehicle information system of FIGS. 2A-B has been installed.

FIG. 4A provides a view of a passenger cabin 380 of a passenger vehicle 390, such as the automobile 390A (shown in FIG. 2A) and/or the aircraft 390B (shown in FIG. 2B), aboard which the vehicle information system 300 has been installed. The passenger cabin 380 is illustrated as including a plurality of passenger seats 382, and each passenger seat 382 is associated with a selected user interface system 360. Each user interface system 360 can include a video interface system 362 and/or an audio interface system 364. Exemplary video interface systems 362 can include overhead cabin display systems 362A with central controls, seatback display systems 362B or armrest display systems (not shown) each with individualized controls, crew display panels, and/or handheld presentation systems. The audio interface systems 364 can be provided in any conventional manner, including an overhead speaker system 364A, the handheld presentation systems, and/or headphones coupled with an audio jack provided, for example, at an armrest 388 of the passenger seat 382. A speaker system likewise can be associated with the passenger seat 382, such as a speaker system 364B disposed within a base 384B of the passenger seat 382 and/or a speaker system 364C disposed within a headrest 384C of the passenger seat 382. In a preferred embodiment, the audio interface system 364 can include an optional noise-cancellation system for further improving sound quality produced by the audio interface system 364.

The video interface systems 362 and the audio interface systems 364 can be installed at any suitable cabin surface, such as a seatback 386, wall 396, ceiling, and/or bulkhead, or an armrest 388 of a passenger seat 382 in any conventional manner including via a mounting system 363 provided in the manner set forth co-pending U.S. patent applications, entitled "SYSTEM AND METHOD FOR MOUNTING USER INTERFACE DEVICES," Ser. No. 11/828,193, filed on Jul. 25, 2007, and entitled "USER INTERFACE DEVICE AND METHOD FOR PRESENTING VIEWING CONTENT," Ser. No. 11/835,371, filed on Aug. 7, 2007, which are assigned to the assignee of the present application and the respective disclosures of which are hereby incorporated herein by reference in their entireties.

As shown in FIG. 4A, the user interface system 360 likewise can include an input system 366 for permitting the user (or passenger) to communicate with the vehicle information system 300, such as via an exchange of control signals 220. For example, the input system 366 can permit the user to enter one or more user instructions 230 for controlling the operation of the vehicle information system 300. Illustrative user instructions 230 can include instructions for initiating communication with the content source 310, instructions for selecting viewing content 210 for presentation, and/or instructions for controlling the presentation of the selected viewing content 210. If a fee is required for accessing the viewing content 210, payment information likewise can be entered via the input system 366.

The input system 366 can be provided in any conventional manner and typically includes one or more switches (or pushbuttons), such as a keyboard or a keypad, and/or a pointing device, such as a mouse, trackball, or stylus. As desired, the input system 366 can be at least partially integrated with, and/or separable from, the associated video interface system 362 and/or audio interface system 364. For example, the video interface system 362 and the input system 366 can be provided as a touchscreen display system. The input system 366 likewise can include one or more input ports (not shown) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal media device 200 (shown in FIG. 1) with the vehicle information system 300. Passengers (not shown) who are traveling aboard the vehicle 390 thereby can enjoy personally-selected viewing content during travel. The access point 368 is located proximally to an associated passenger seat 382 and can be provided at any suitable cabin surface, such as a seatback 386, wall 396, ceiling, and/or bulkhead.

Figure 4B:
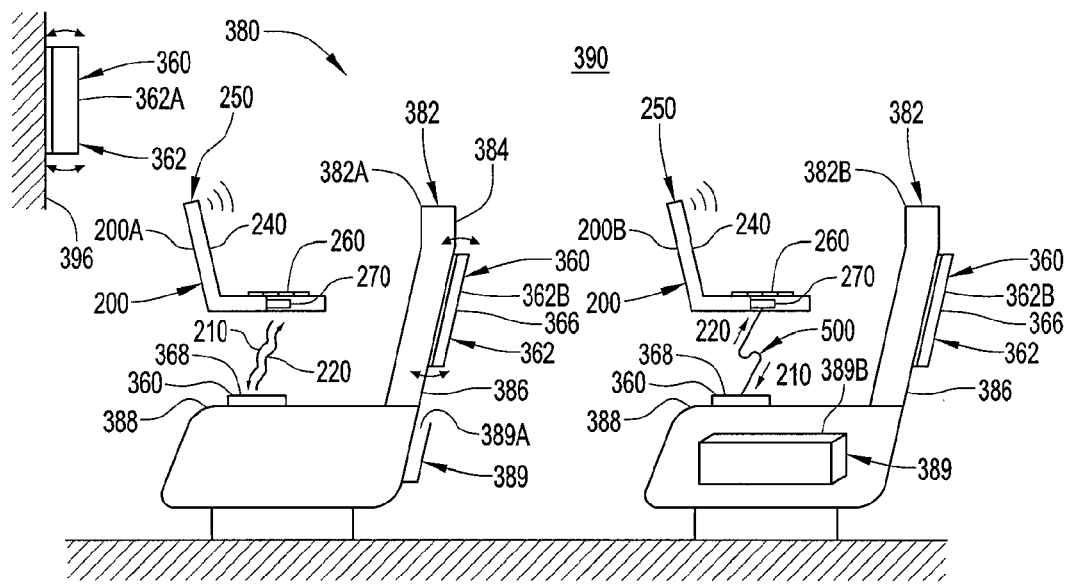
FIG. 4B is an exemplary top-level drawing illustrating an embodiment of the vehicle information system of FIG. 4A, wherein the vehicle information system is in communication with the personal media device of FIG. 1.

Turning to FIG. 4B, the personal media devices 200 and the vehicle information system 300 are shown as communicating via respective access points 368. Being provided in the manner set forth above with reference to FIG. 1, the illustrated personal media devices 200 each include a video display system 240 for visually presenting the viewing content 210 and an audio system 250 for audibly presenting the viewing content 210. Each personal media device 200 can include a user control system 260, which can be provided in any conventional manner and typically includes one or more switches (or pushbuttons), such as a keyboard or a keypad, and/or a pointing device, such as a mouse, trackball, or stylus. The personal media devices 200 thereby can select desired viewing content 210 and control the manner in which the selected viewing content 210 is received and/or presented.

The personal media devices 200 likewise include a communication port (or connector) 270. The communication port 270 enables the personal media devices 200 to communicate with the vehicle information system 300 via the access points 368 of the user interface systems 360. As illustrated with personal media device 200A, the communication port 270 and the access points 368 can supported wireless communications; whereas, support for wired communications between the communication port 270 and the access points 368 via a communication cable assembly 500 is shown with personal media device 200B. When the communication port 270 and the access points 368 are in communication, the vehicle information system 300 supports a simple manner for permitting the associated personal media device 200 to be integrated with the vehicle information system 300 using a user-friendly communication interface.

When the personal media device 200 and the vehicle information system 300 are in communication, the vehicle information system 300 can perform a plurality of integration tasks simultaneously, enabling the personal media device 200 to become fully integrated with the vehicle information system 300 via a selected access point 368. The system elements of the vehicle information system 300 and the personal media device 200 thereby become interchangeable. The personal media device 200 likewise can receive control signals (or commands) 220 and/or operating power 220P from the vehicle information system 300. Thereby, the personal media device 200 advantageously can become a seamless part of the vehicle information system 300.

For example, user instructions 230 (shown in FIGS. 2A-B) for controlling the operation of the vehicle information system 300 can be provided via the input system 366 of the vehicle information system 300 and/or the user control system 260 of the personal media device 200. In other words, the input system 366 of the vehicle information system 300 and/or the user control system 260 of the personal media device 200 can be used to select viewing content 210 and control the manner in which the selected viewing content 210 is received and/or presented. The selected viewing content 210 can be provided by a relevant content source 310 (shown in FIGS. 2A-B) of the vehicle information system 300 and/or by storage media (not shown) disposed within the personal media device 200. A video portion of the selected viewing content 210 thereby can be presented via the video presentation system 362 of the vehicle information system 300 and/or the video display system 240 of the personal media device 200. The audio presentation system 364 of the vehicle information system 300 and/or the audio system 250 of the personal media device 200 can be used to present an audio portion of the selected viewing content 210. If the video display system 240 of the personal media device 200 is much smaller than the video presentation system 362 of the vehicle information system 300, a passenger may prefer to view the selected viewing content 210 via the larger video presentation system 362.

When no longer in use and/or direct physical contact with the personal media device 200 is not otherwise required, the personal media device 200 can be stored at the passenger seat 382. For example, the passenger seat 382 can include a storage compartment 389 for providing storage of the personal media device 200. The storage compartment 389 can be provided in any conventional manner and at any suitable portion of the passenger seat 382. As illustrated with passenger seat 382B, the personal media device 200 can be placed in a storage pocket 389B formed in the armrest 388 of the passenger seat 382B. The storage compartment 389 likewise can be provided on the seatback 386 and/or the headrest 384 of the passenger seat 382. Storage compartment 389A of passenger seat 382A, for example, is shown as being formed on the lower seatback 386 of the passenger seat 382A. As desired, the storage compartment 389 can comprise an overhead storage compartment, a door storage compartment, a storage compartment provided underneath the passenger seat 382, or any other type of conventional storage compartment, such as a glove compartment, trunk, or closet, available in the passenger vehicle 390.

Figure 5A:
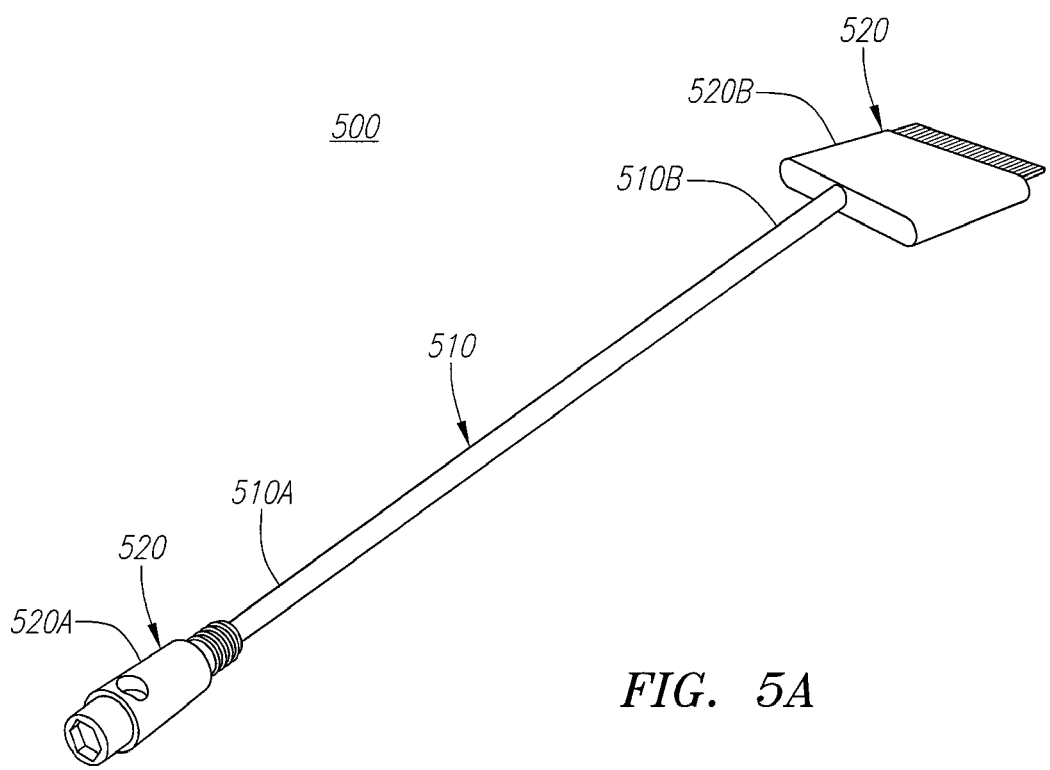
FIG. 5A is an exemplary detail drawing illustrating an embodiment of a communication cable assembly for supporting wired communications between the information system and the personal media device each of FIG. 1.

An exemplary communication cable assembly 500 for supporting wired communications between the vehicle information system 300 and the personal media device 200 is illustrated in FIG. 5A. The communication cable assembly 500 can comprise a conventional communication assembly, having a communication cable 510 with a suitable cable length and being terminated with two or more communication connectors (or ports) 520. As shown in FIG. 5A, the communication cable 510 is terminated with a system communication connector (or port) 520A for removably coupling with the vehicle information system 300 (shown in FIGS. 2A-B) and a device communication connector (or port) 520B for removably coupling with the personal media device 200 (shown in FIGS. 1, 4B). The system communication connector 520A and the device communication connector 520B each can comprise any conventional type of connector system. Although shown and described as being provided on respective opposite end regions 510A, 510B of the communication cable assembly 500 for purposes of illustration only, the system and device communication connectors 520A, 520B can be provided the communication cable assembly 500 in any conventional manner.

Figure 5B:
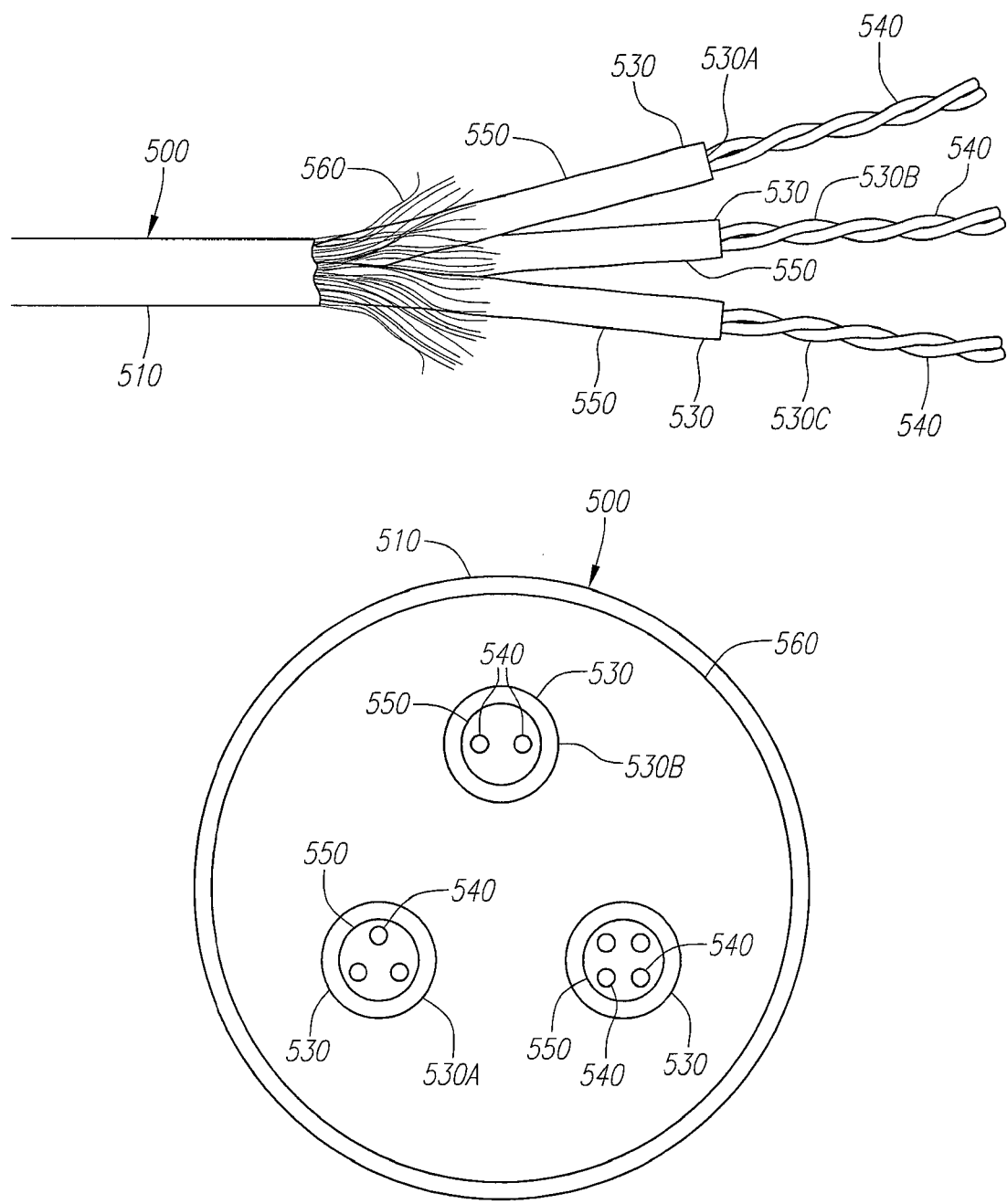
FIG. 5B is an exemplary detail drawing illustrating an embodiment of a communication cable suitable for use with the communication cable assembly of FIG. 5A.

In the manner set forth above, the communication cable assembly 500 can be utilized to transmit a variety of diverse signal types, such as audio signals, video signals, data signals, control signals, and power signals. The communication cable 510 preferably is provided in a manner to minimize interference (or crosstalk) among these diverse signals. FIG. 5B shows an exemplary communication cable 510 suitable for use with the communication cable assembly 500. Turning to FIG. 5B, the communication cable 510 includes a plurality of conductor bundles 530. Each conductor bundle 530 is shown as comprising a plurality of insulated conductors 540 disposed within a conductive shielding 550. The conductors 540 associated with each signal type likewise can be provided in a twisted configuration as illustrated in FIG. 5B. For example, audio signals can be transmitted via conductor bundle 530A having three conductors 540 for a left audio channel, a right audio channel, and an audio return, wherein the three conductors 540 are twisted and disposed within conductive shielding 550. A video signal, such as composite video signals, and a video return signal can be transmitted via conductor bundle 530B with two conductors 540 that are twisted and disposed within conductive shielding 550.

Similarly, data signals (and/or control signals) can be transmitted via conductor bundle 530C of conductors 540 that are twisted and disposed within conductive shielding 550. If the data signals comprise Universal Serial Bus (USB) data signals, for example, the data signals comprise two conductors for the USB data signals and two more conductors for USB power signals, wherein the four conductors 540 are twisted and disposed within the conductive shielding 550. As desired, the communication cable 510 can include a separate power signal and power return signal for providing operating power to the personal media device 200. The conductors 540 within the communication cable 510 can be provided with any suitable size (or diameter) and typically are provided as 24 AWG or 26 AWG conductors with an impedance between approximately seventy-five and one hundred ohms. The conductor bundles 530 are shown as being disposed within a cable shield 560, such as a braided shield.

Figure 6A:
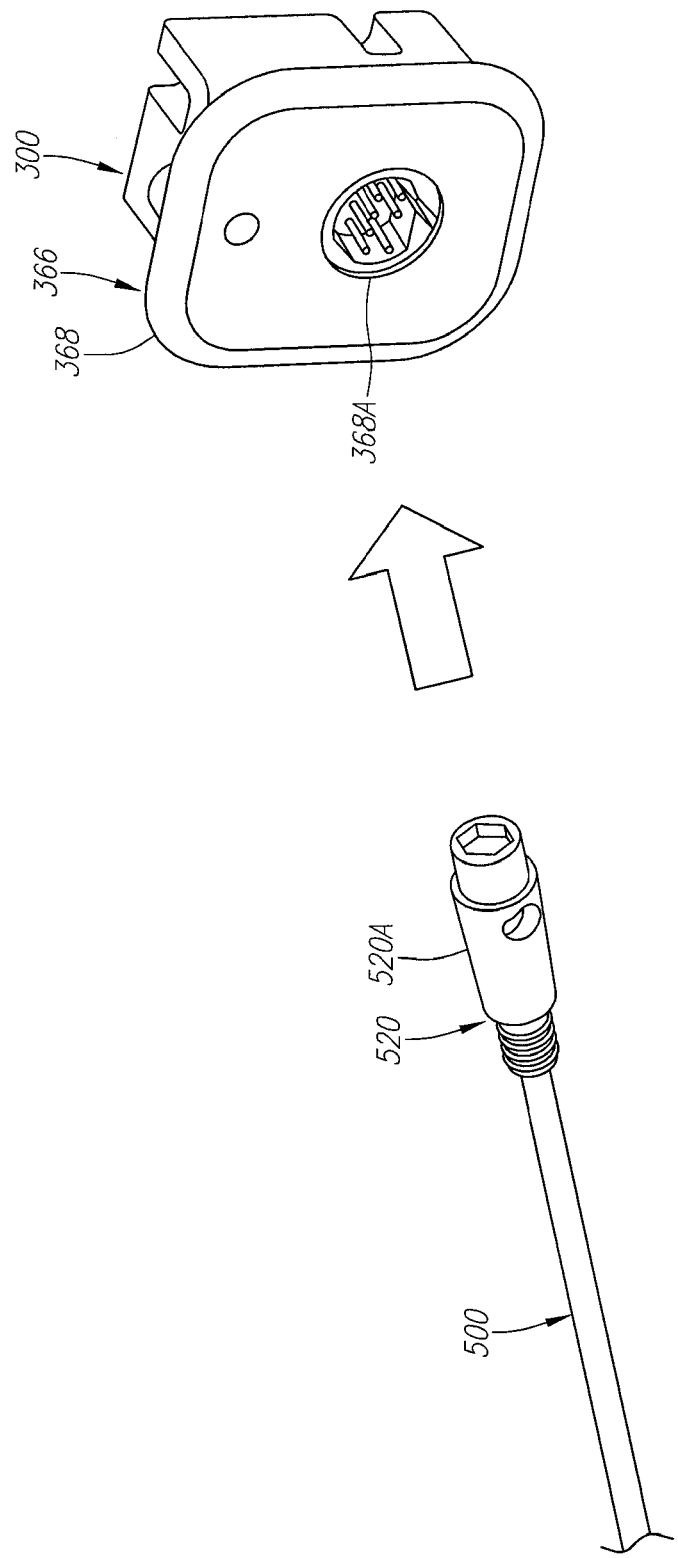
FIG. 6A is an exemplary detail drawing illustrating an embodiment of a system communication connector (or port) for engaging the communication cable assembly of FIG. 5A.

Turning to FIG. 6A, the system communication connector 520A of the communication cable assembly 500 is shown as being provided as a Deutsches Institut für Normung (DIN) type connector. In particular, the system communication connector 520A is shown as being a nine-pin mini-DIN connector (or plug). The access point 368 of the vehicle information system 300 likewise is shown as including a communication connector (or port) 368A. Being provided in the manner of the system communication connector 520A, the communication connector 368A of the access point 368 is shown as a nine-pin mini-DIN connector (or receptacle) and is configured to cooperate with the system communication connector 520A. The communication connector 368A thereby can receive, and couple with, the system communication connector 520A.

As desired, the system communication connector 520A likewise can be removed (or disconnected) from the communication connector 368A. When the system communication connector 520A of the communication cable assembly 500 and the communication connector 368A of the access point 368 are provided as nine-pin DIN connectors, the communication cable assembly 500 advantageously can transmit audio, video, data, and/or power signals via the bundled, shielded conductors set forth above to minimize interference (or crosstalk). Although shown and described as being nine-pin mini-DIN connectors for purposes of illustration, the system communication connector 520A and the communication connector 368A can be provided as any conventional type of mating connector systems.

Figure 6B:
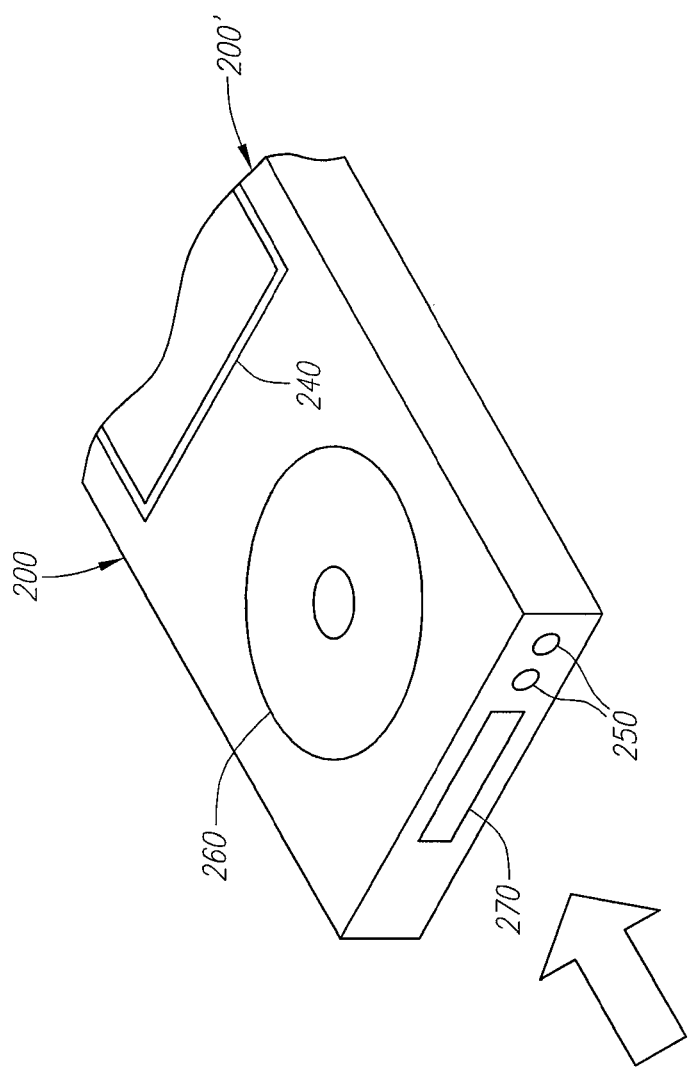
FIG. 6B is an exemplary detail drawing illustrating an embodiment of a device communication connector (or port) for engaging the communication cable assembly of FIG. 5A.

If the personal media device 200 comprises an iPod® digital electronic media device 200' as shown in FIG. 6B, for example, the device communication connector 520B of the communication cable assembly 500 can comprise a thirty-pin connector suitable for being received by, and removably coupling with, the communication connector 270 of the iPod® digital electronic media device 200'. In other words, the device communication connector 520B of the communication cable assembly 500 can cooperate with the communication connector 270 of the iPod® digital electronic media device 200'. The iPod® digital electronic media device 200' is shown as including a video display system 240, an audio system 250, and a user control system 260 each being provided in the manner set forth in more detail above with reference to FIG. 4B. As shown in FIG. 6B, the audio system 250 of the iPod® digital electronic media device 200' includes at least one audio jack for receiving a headset (not shown). The iPod® digital electronic media device 200' thereby can select desired viewing content 210 (shown in FIG. 4B) and control the manner in which the selected viewing content 210 is received and/or presented.

When the system communication connector 520A of FIG. 6A and the device communication connector 520B are combined in accordance with pinout information set forth in the Table below, a communication cable assembly 500 is formed to couple the iPod® digital electronic media device 200' with the vehicle information system 300. Preferably, the Accessory Identification pin (pin 10) and the Accessory Detect pin (pin 20) of the device communication connector 520B are coupled via a resistive element, such as a 191KΩ, 1% resistor; whereas, the Accessory Detect pin (pin 20) can be further coupled with at least one Digital Ground pin (pins 1, 2, 15, 16, and 30). The Digital Ground pins (pins 1, 2, 15, 16, and 30) each can coupled together, and the Audio Return (or Analog Ground) pins (pins 24 and 29) can be coupled together. Thereby, the communication cable assembly 500 can be configured to conduct audio, video, data, and power signals between the iPod® digital electronic media device 200' and the vehicle information system 300.

TABLE

Pinout of Communication Cable Assembly

| Signal Name | Mini-DIN Connector for System Communication Connector 520A | iPod Connector for Device Communication Connector 520B |
| --- | --- | --- |
| Digital Ground DGND | 8 | 1 |
| Digital Ground DGND |  | 2 |
| [USB] Data D+ | 5 | 4 |
| [USB] Data D− | 6 | 6 |
| [USB] Power | 9 | 8 |
| Accessory Identification |  | 10 |
| Digital Ground DGND |  | 15 |
| Digital Ground DGND |  | 16 |
| Accessory Detect |  | 20 |
| Composite Video | 1 | 23 |
| Audio Return AGND | 2 | 24 |
| Audio Line Out (Left) | 7 | 27 |
| Audio Line Out (Right) | 3 | 28 |
| Audio Return AGND | 4 | 29 |
| Digital Ground DGND |  | 30 |

Figure 7B:
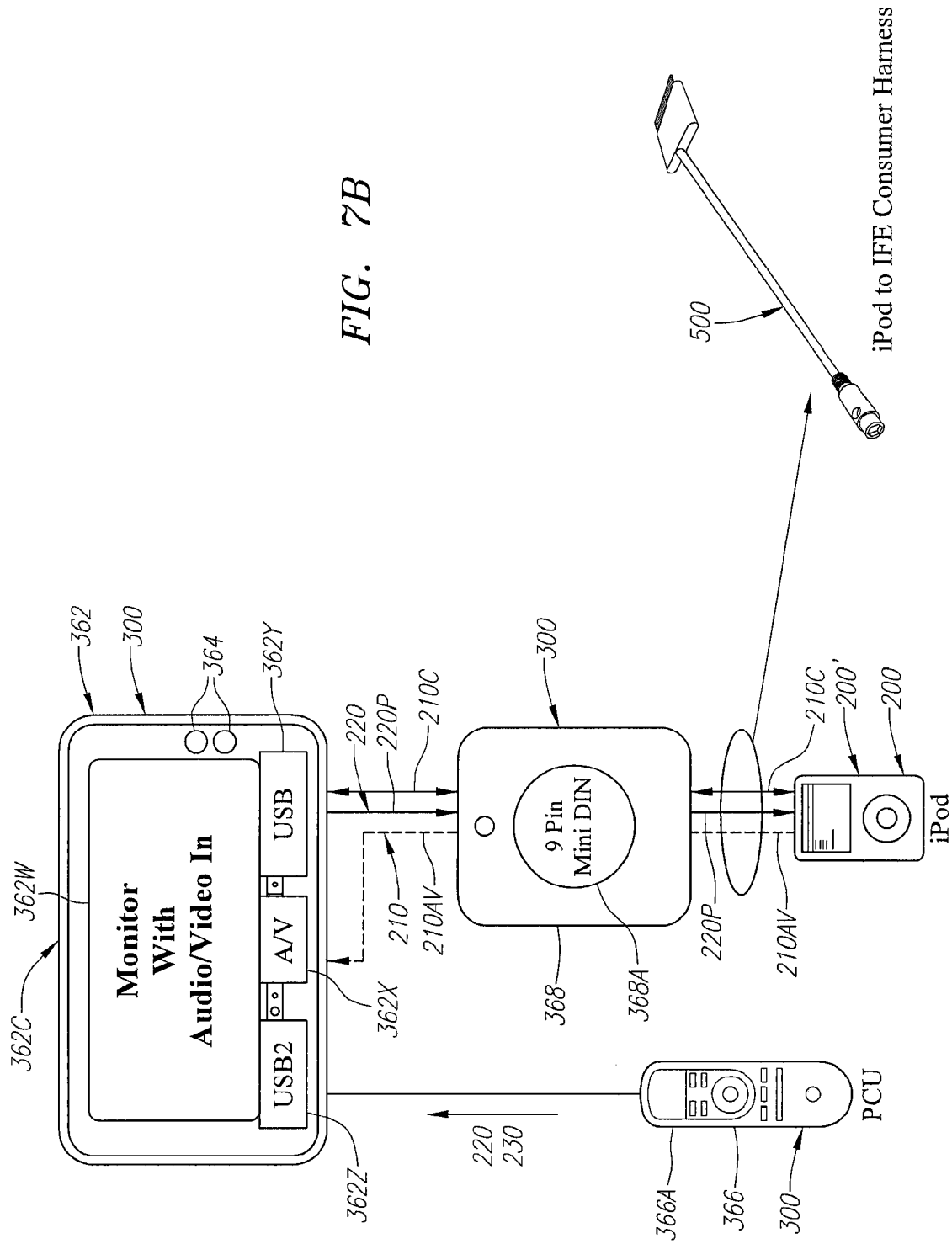
FIG. 7B is an exemplary detail drawing illustrating an alternative embodiment of the vehicle information system of FIG. 7A, wherein the vehicle information system further includes a handheld user control system.

Turning to FIGS. 7A-B, the vehicle information system 300 is shown as being in communication with the iPod® digital electronic media device 200' via the communication cable assembly 500. The vehicle information system 300 of FIG. 7A includes the access point 368 with the communication connector 368A. The system communication connector 520A of the communication cable assembly 500 can engage (or couple with) the communication connector 368A of the access point 368; whereas, the device communication connector 520B of the communication cable assembly 500 can engage (or couple with) the communication connector 270 (shown in FIG. 6B) of the iPod® digital electronic media device 200'. The vehicle information system 300 and the iPod® digital electronic media device 200' thereby can communicate in real time via the communication cable assembly 500.

The access point 368 likewise can communicate with the video presentation system 362 and/or the audio presentation system 364 of the vehicle information system 300 in the manner set forth in more detail above. As shown in FIG. 7A, the video presentation system 362 and the audio presentation system 364 are provided as an integrated audio/video presentation system 362C. In other words, the video presentation system 362 can include a viewing screen 362W disposed on the integrated audio/video presentation system 362C, and one or more audio jacks (or internal speaker systems) are provided on the integrated audio/video presentation system 362C as the audio presentation system 364. The integrated audio/video presentation system 362C can include an audio/video communication port (or connector) 362X for receiving viewing content 210, such as audio and/or video viewing content (and content menus) 210AV, from the iPod® digital electronic media device 200' via the access point 368. The audio and/or video viewing content 210AV thereby can be presented by the video presentation system 362 and/or the audio presentation system 364 of the vehicle information system 300.

Alternatively, and/or additionally, the integrated audio/video presentation system 362C can include at least one data communication port (or connector) 362Y for exchanging viewing content 210, control signals (or commands) 220, such as user control signals (or user control instructions) 230, between the iPod® digital electronic media device 200' and the vehicle information system 300. As shown in FIG. 7A, the data communication port 362Y can support exchanges of data content 210C and/or supply operating power 220P from the vehicle information system 300 to the iPod® digital electronic media device 200'. The data communication port 362Y is illustrated as comprising a Universal Serial Bus (USB) communication port, which can supporting USB data and power signaling. The supply operating power 220P can provide power to operate the iPod® digital electronic media device 200' and/or to charge an internal battery system (not shown) of the iPod® digital electronic media device 200'.

Although shown and described as including the data communication port 362Y as a USB communication port for purposes of illustration only, the integrated audio/video presentation system 362C can include any suitable number of data communication ports 362Y each being configured to support a selected conventional communication protocol. The number of data communication ports 362Y preferably is greater than or equal to the number of personal media devices 200 to be supported by the integrated audio/video presentation system 362C. If an insufficient number of data communication ports 362Y are available to support the number of personal media devices 200, the vehicle information system 300 can include a data port expansion system, such as Universal Serial Bus (USB) hub system 640 (shown in FIG. 8C), to provide additional data communication ports for the personal media devices 200.

The user interface system 360 of the vehicle information system 300 includes the input system 366 for permitting a user to communicate with the vehicle information system 300 in the manner discussed in more detail above with reference to FIGS. 4A-B. FIG. 7A shows that the input system 366 can be associated with the integrated audio/video presentation system 362C and/or the iPod® digital electronic media device 200'. The input system 366 of FIG. 7A includes the user control system 260 of the iPod® digital electronic media device 200'. The integrated audio/video presentation system 362C likewise can be associated with the input system 366. For example, the integrated audio/video presentation system 362C can include a touchscreen display system and/or at least one user control as shown in FIG. 7A.

Alternatively, and/or additionally, the user interface system 360 can further include an optional handheld user control system 366A as illustrated in FIG. 7B. The handheld user control system 366A can be provided in any conventional manner, including in the manner set forth in more detail in the above-referenced related nonprovisional patent application, "PORTABLE USER CONTROL DEVICE AND METHOD FOR VEHICLE INFORMATION SYSTEMS," Ser. No. 12/210,689, Sep. 15, 2008. The user control system 366A can communicate with the vehicle information system 300 in a wireless manner or, as shown in FIG. 7B, a wired manner. In a preferred embodiment, the integrated audio/video presentation system 362C can include a data communication port (or connector) 362Z for communicating with the user control system 366A. The data communication port 362Y is illustrated as comprising a Universal Serial Bus (USB) communication port, which can supporting USB data and power signaling.

When in communication with the vehicle information system 300, the user control system 366A can provide control signals (or commands) 220, such as user control signals (or user control instructions) 230, to the vehicle information system 300 and/or the iPod® digital electronic media device 200'. Stated somewhat differently, the vehicle information system 300 can provide data content 210C and/or operating power 220P to the iPod® digital electronic media device 200' and can receive audio and/or video viewing content 210AV and/or data content 210C from the iPod® digital electronic media device 200'. When the user interface system 360 includes the handheld user control system 366A, the iPod® digital electronic media device 200' may be conveniently stored in the storage compartment 389 (shown in FIGS. 4A-B) provided at the passenger seat 382 (shown in FIGS. 4A-B) while the vehicle information system 300 continues to communicate with the iPod® digital electronic media device 200' via the access point 368.

Viewing content 210 (shown in FIGS. 2A-B) available on the vehicle information system 300 as well as viewing content 210 available from any connected personal media devices 200 and/or iPod® digital electronic media devices 200' can be selected for presentation in any conventional manner. Since the personal media devices 200, such as iPod® digital electronic media devices 200', typically include personally-provided viewing content, the viewing content 210 provided by a selected personal media device 200 preferably is only available at the associated passenger seat 382 (shown in FIGS. 4A-B) within a vehicle 390 (shown in FIGS. 2A-B) to protect the privacy of the passenger (or user). The viewing content 210 provided by the selected personal media device 200, however, can be made available at other passenger seats 382 within the vehicle 390, as desired. For example, if two or more passengers are traveling in a group, the passengers in the group may wish to share the viewing content 210 from their personal media devices 200 with each other via the vehicle information system 300. Accordingly, a passenger can elect to make the viewing content 210 on his personal media device 200 available to one or more selected passengers (or selected passenger seats 382) via the vehicle information system 300 during travel.

Figure 8A:
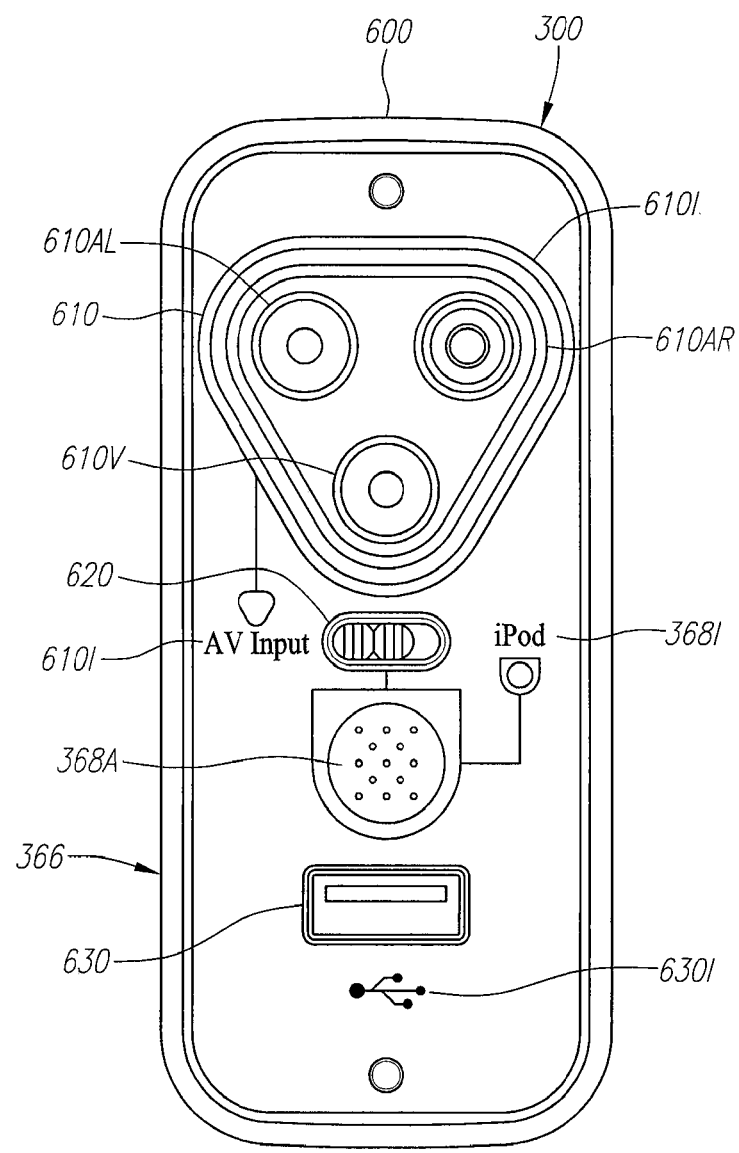
FIG. 8A is an exemplary detail drawing illustrating an embodiment of the system communication connector of FIG. 5A, wherein the system communication connector is disposed within a user-friendly interface system.
Figure 8B:
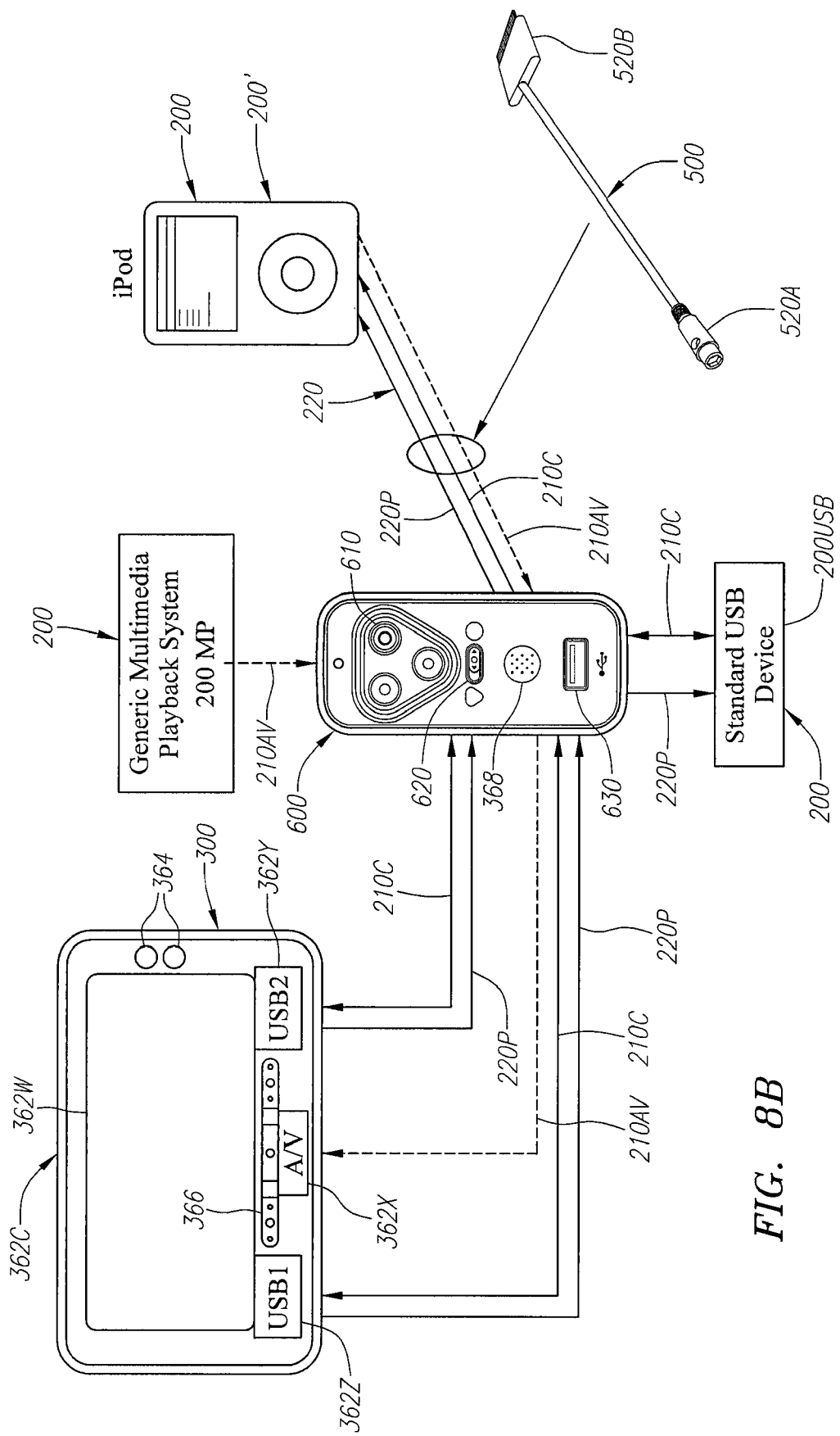
FIG. 8B is an exemplary detail drawing illustrating an embodiment of the system communication connector of FIG. 8A, wherein the vehicle information system is in communication with the personal media device via the communication cable assembly of FIGS. 5A-B.

As desired, the communication connector 368A can be associated with, or included within, a user-friendly interface system 600 as illustrated in FIGS. 8A-B. The interface system 600 (and/or the access point 368) can be associated with a selected seat electronics box 324 (shown in FIG. 3) and preferably is located proximally to an associated passenger seat 382 (shown in FIGS. 4A-B) and can be provided at any suitable cabin surface, such as a seatback 386 (shown in FIGS. 4A-B), wall 396 (shown in FIGS. 4A-B), ceiling, and/or bulkhead. The interface system 600 advantageously can provide a manner for coupling the vehicle information system 300 with a diverse assortment of personal media devices 200 (shown in FIG. 1). The communication connector 368A can be disposed at the interface system 600 and can be associated with identifying indicia 368I that identifies the communication connector 368A. As shown in FIG. 8A, the identifying indicia 368I can identify the communication connector 368A in any conventional manner, including use of text, such as words or abbreviations, and/or at least one symbol that identify the function of the communication connector 368A. The textual description can be provided in one or more relevant languages and preferably is changeable such that a suitable language is presented based upon the geographical location of the vehicle information system 300.

The interface system 600 likewise can include one or more other communication connectors (or ports) for communicating with personal media devices 200. As desired, more than one personal media devices 200 can simultaneously communicate with the vehicle information system 300 via the interface system 600. The interface system 600 is shown as including an audio/video communication connector (or port) 610. The audio/video communication connector 610 is suitable for coupling with a selected personal media device 200, such as a multimedia playback system 200MP (shown in FIG. 8B), and providing audio and/or video signals (not shown) from the personal media device 200 to the vehicle information system 300. In the manner set forth above with reference to the communication connector 368A, the audio and/or video signals from the multimedia playback system 200MP can be presented on the video presentation system 362 (shown in FIGS. 4A-B) and/or the audio presentation system 364 (shown in FIGS. 4A-B) of the vehicle information system 300.

The audio/video communication connector 610 can be provided in any conventional manner and is shown in FIG. 8A as including three separate connector systems 610AL, 610AR, and 610V. The connector systems 610AL, 610AR, and 610V each can be provided as standard Radio Corporation of America (RCA) jacks. The left audio connector system 610AL is configured for receiving left audio signals from the multimedia playback system 200MP; whereas, the right audio connector system 610AR is configured for receiving right audio signals from the multimedia playback system 200MP. Video signals from the multimedia playback system 200MP can be received by the video connector system 610V. The audio/video communication connector 610 likewise can be associated with identifying indicia 610I that identify the function of the audio/video communication connector 610 (and/or each connector system 610AL, 610AR, and 610V comprising the audio/video communication connector 610) in the manner set forth above with reference to the communication connector 368A.

As desired, the interface system 600 can sense whether a personal media device 200 has been coupled with, and seeks to communicate with, the vehicle information system 300. The interface system 600 thereby can act to facilitate communications between the personal media device 200 and the vehicle information system 300 by, for example, activating one or more relevant communication connectors (or ports). Alternatively, and/or additionally, the interface system 600 can provide a switching system 620 for selecting a suitable communication connector (or port) for communicating with the personal media device 200. The switching system 620 can direct the audio and/or video viewing content 210AV (shown in FIG. 8B) from either the personal media device 200 or the multimedia playback system 200MP to the video presentation system 362 and/or the audio presentation system 364 of the vehicle information system 300. As shown in FIG. 8A, the switching system 620 can be associated with identifying indicia 620I that identify the connector system (or port) relevant for each position of the switching system 620.

The interface system 600 likewise is shown as including at least one standard Universal Serial Bus (USB) communication connector (or port) 630 for coupling with a USB communication connector (or port) of a selected personal media device 200, such as a standard USB media device 200USB (shown in FIG. 8B). When the USB media device 200USB is coupled with the USB communication connector 630, the vehicle information system 300 and the USB media device 200USB can communicate via the USB communication connector 630. The USB communication connector 630 can be associated with identifying indicia 630I that identify the function of the USB communication connector 630 in the manner set forth above with reference to the communication connector 368A.

Figure 8C:
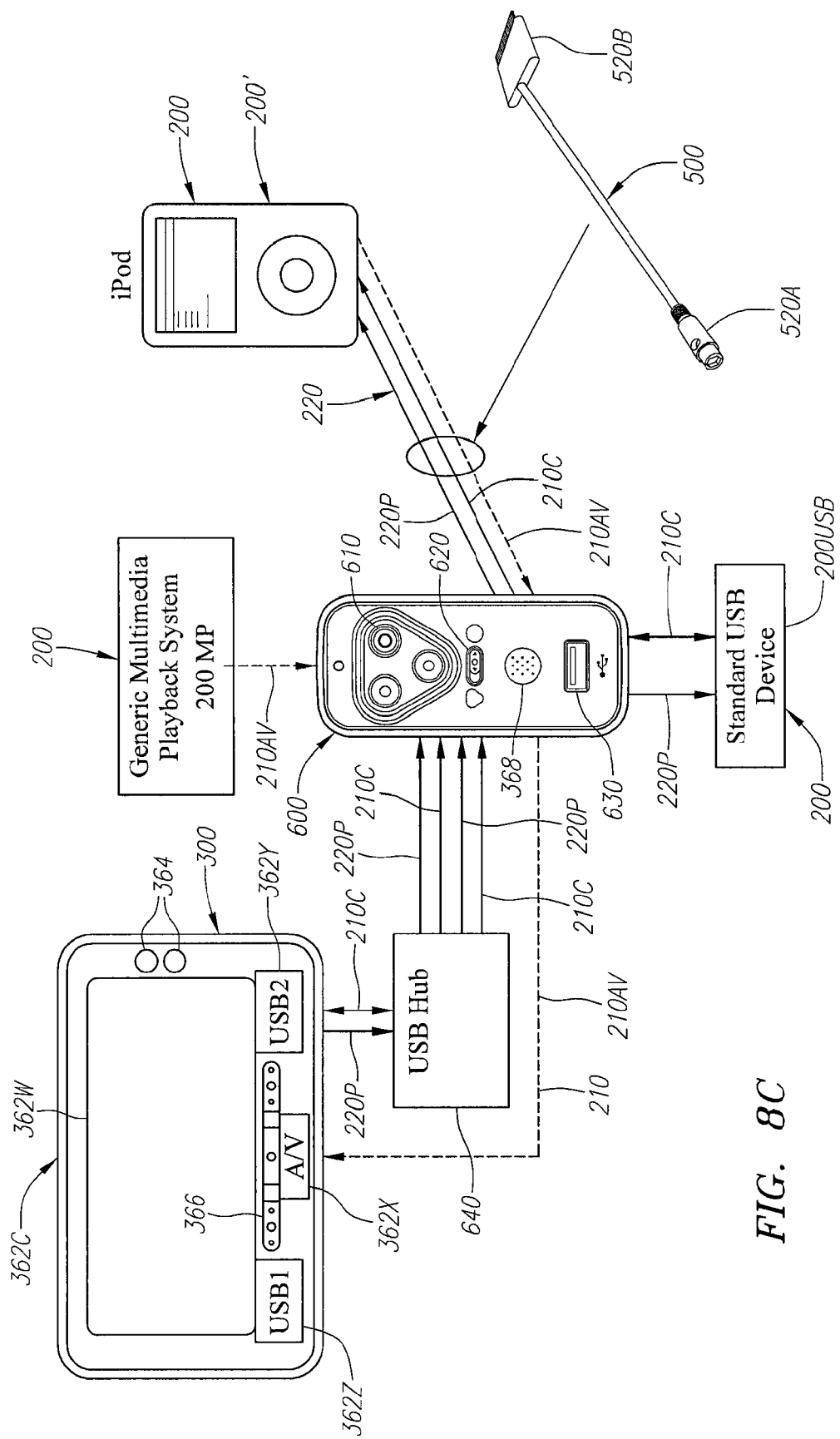
FIG. 8C is an exemplary detail drawing illustrating an alternative embodiment of the system communication connector of FIG. 8B, wherein the vehicle information system includes a port expansion system that can increase a number of personal media devices that can communicate with the vehicle information system.

FIG. 8C shows the vehicle information system 300 as being in communication with the iPod® digital electronic media device 200', the multimedia playback system 200MP, and the USB media device 200USB each via the interface system 600. The vehicle information system 300 further includes a Universal Serial Bus (USB) hub system 640 for coupling the vehicle information system 300 and the interface system 600. The USB hub system 640 advantageously enables the interface system 600 to support multiple iPod® digital electronic media devices 200' and/or USB media devices 200USB via the USB communication port 362Y of the integrated audio/video presentation system 362C. As shown in FIG. 8C, the USB hub system 640 supports exchanges of data content 210C and/or supply operating power 220P from the vehicle information system 300 to the iPod® digital electronic media device 200' and the USB media device 200USB. As desired, the optional handheld user control system 366A (shown in FIG. 7B) can be coupled with the USB communication port 362Z of the integrated audio/video presentation system 362C or the USB communication connector 630 of the interface system 600.

If the personal media device 200, such as the iPod® digital electronic media device 200' supports streaming video signaling, the vehicle information system 300 can communicate with the personal media device 200 via the USB communication connector 630 of the interface system 600. The vehicle information system 300 thereby would advantageously be enabled to have direct access to the viewing content 210 stored within the personal media device 200.

Figure 9:
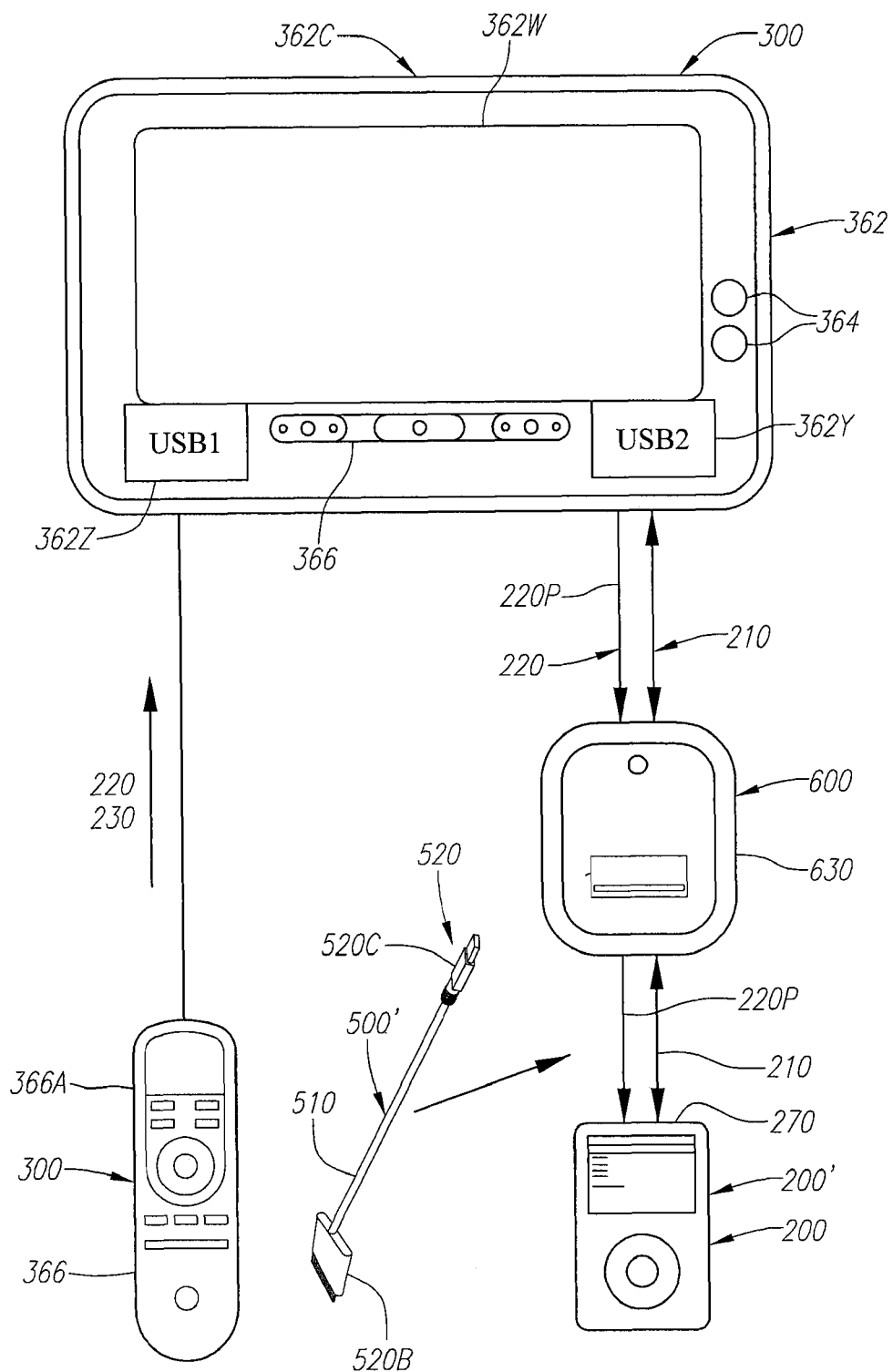
FIG. 9 is an exemplary detail drawing illustrating another alternative embodiment of the system communication connector of FIG. 8B, wherein the vehicle information system is in communication with the personal media device via Universal Serial Bus Synchronization communication cable assembly.

Turning to FIG. 9, for example, the vehicle information system 300 is shown as communicating with the iPod® digital electronic media device 200' via the USB communication connector 630. A communication cable assembly 500' couples the iPod® digital electronic media device 200' and the USB communication connector 630. Being provided in the manner set forth above with reference to the communication cable assembly 500 (shown in FIGS. 5A-B), the communication cable assembly 500' can comprise a conventional communication assembly, having a communication cable 510 with a suitable cable length and being terminated with two or more communication connectors (or ports) 520. The communication cable assembly 500' includes the device communication connector 520B of the communication cable assembly 500, and the device communication connector 520B can removably couple with the communication connector 270 of the iPod® digital electronic media device 200'. System communication connector 520C of the communication cable assembly 500' comprises a conventional Universal Serial Bus (USB) communication connector and can removably couple with the USB communication connector 630 of the interface system 600. Stated somewhat differently, the communication cable assembly 500' can be provided as a Universal Serial Bus Synchronization (USB SYNC) communication cable assembly for coupling the vehicle information system 300 and the iPod® digital electronic media device 200'.

When the USB communication connector 630 of the interface system 600 and the communication connector 270 of the iPod® digital electronic media device 200' are coupled via the communication cable assembly 500', the vehicle information system 300 can perform a plurality of integration tasks simultaneously, enabling the iPod® digital electronic media device 200' to become fully integrated with the vehicle information system 300 in the manner set forth in more detail above. The system elements of the vehicle information system 300 and the iPod® digital electronic media device 200' thereby become interchangeable. The vehicle information system 300 likewise can provide control signals (or commands) 220 and/or operating power to the iPod® digital electronic media device 200' and can receive audio and/or video viewing content 210 from the iPod® digital electronic media device 200' for presentation via the integrated audio/video presentation system 362C. Thereby, the iPod® digital electronic media device 200' advantageously can become a seamless part of the vehicle information system 300.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An access point for interfacing a diverse assortment of personal media devices having different connection requirements with a display being disposed at a user chair and having at least one data port and an audio/video port, comprising:
   a plurality of communication ports for alternatively cooperating with a device communication port of a selected personal media device and including:
      a first communication port having a first connection requirement and being concurrently coupled with a first predetermined data port and the audio/video port of the display; and
      a second communication port having a second connection requirement being different from the first connection requirement and being coupled with a second predetermined data port of the display,
   wherein the access point system senses whether a preselected communication port is cooperating with the device communication port and enables said preselected communication port to support communication between the sensed personal media device and the display such that the display at least one of presents audio/video content received at the audio/video port from the sensed personal media device and responds to data signals exchanged with the sensed personal media device via a relevant data port, and wherein said preselected communication port comprises a nine-pin mini Deutsches Institut für Normung (DIN) type connector.

2. The access point of claim 1, wherein the personal media devices are selected from a device group consisting of a laptop computer, a palmtop computer, a personal digital assistant, a cellular telephone, a MPEG Audio Layer 3 (MP3) device, a Universal Serial Bus (USB) device, a multimedia playback system, an iPod® digital electronic media device, and an iPhone® digital electronic media device.

3. The access point of claim 1, wherein said preselected communication port cooperates with the device communication port of the sensed personal media device via a communication cable assembly.

4. The access point of claim 3, wherein the sensed personal media device comprises an iPod® digital electronic media device, and wherein the communication cable assembly is terminated with a device communication connector suitable for removably coupling with the first device connector system of the iPod® digital electronic media device.

5. The access point of claim 1, wherein at least one of said communication ports comprises a Universal Serial Bus (USB) communication connector or a wireless communication port.

6. The access point of claim 1, wherein the first and second predetermined data ports comprise the same data port of the display.

7. The access point of claim 6, further comprising a hub system, said first and second communication ports communicating with the first predetermined data port of the display via said hub system.

8. The access point of claim 7, wherein the first predetermined data port of the display comprises a Universal Serial Bus (USB) port, and wherein said hub system comprises a USB hub system.

9. The access point of claim 1, wherein the display includes an input system for controlling an operation of the sensed personal media device.

10. The access point of claim 1, wherein the sensed personal media device includes an input system for controlling an operation of the display.

11. The access point of claim 1, further comprising a user control system for communicating with a selected data port of the display and for providing control signals for controlling an operation of at least one of the display and the sensed personal media device.

12. The access point of claim 1, wherein the relevant data port of the display provides operating power to the sensed personal media device.

13. The access point of claim 1, further comprising a third communication port having a third connection requirement being different from the first and second connection requirements and being coupled with the audio/video port of the display, wherein, upon sensing whether said third communication port is cooperating with the device communication port, the access point enables said third communication port to support communication between the sensed personal media device and the display such that the display presents audio/video content received at the audio/video port from the sensed personal media device.

14. The access point of claim 13, further comprising a switching system for selecting between said first and third communication ports, wherein the access point couples the sensed personal media device with the audio/video port of the display via said first communication port when said switching system is in a first switch position and couples the sensed personal media device with the audio/video port of the display via said third communication port when said switching system is in a second switch position.

15. The access point of claim 13, wherein said third communication port is selected from a group consisting of an audio/video communication connector and a Radio Corporation of America (RCA) jack.

16. An information system suitable for installation aboard a passenger vehicle, comprising:
- a headend system for providing overall system control functions for the information system;
- a display having at least one data port and an audio/video port;
- an access point for interfacing a diverse assortment of personal media devices having different connection requirements with said display and being provided in accordance with claim 1, said access point for sensing whether a preselected communication port is cooperating with a device communication port and enabling said preselected communication port to support communication between a sensed personal media device and the display; and
- a distribution system that communicates with said headend system, said display, and said access point.

17. The information system of claim 16, wherein said headend system communicates with a content source is selected from a group consisting of a local content source that is at least partially integrated with said headend system and a remote content source that is distal from said headend system.

18. The information system of claim 17, wherein said headend system communicates with said remote content source via a satellite communication system.

19. The information system of claim 17, wherein selected content available from the content source is streamed to at least one of said display and the sensed personal media device cooperating with said access point for presentation.

20. The information system of claim 16, further comprising a plurality of displays each having at least one data port and an audio/video port, and a plurality of access points each for interfacing the diverse assortment of the personal media devices with a respective display.

21. The information system of claim 16, wherein said distribution system is selected from a group consisting of a wired distribution system and a wireless distribution system.

22. The information system of claim 16, wherein the information system is suitable for installation aboard an aircraft.

23. An aircraft, comprising:
- a fuselage;
- a plurality of passenger seats arranged within the fuselage; and
- a vehicle information system coupled with said fuselage and being provided in accordance with claim 16, said vehicle information system including a display having at least one data port and an audio/video port and an access point for interfacing a diverse assortment of personal media devices having different connection requirements with said display.

24. The aircraft of claim 23, wherein said display is disposed at one of an armrest, a seatback, and a headrest of a selected passenger seat and a predetermined area above the selected passenger seat.

25. The aircraft of claim 23, wherein said access point is disposed at one of an armrest, a seatback, and a headrest of a selected passenger seat and a predetermined area above the selected passenger seat.

26. An access point, comprising:
- an audio/video display being disposed at a user chair and having at least one data port and an audio/video port; and
- a plurality of communication ports for alternatively cooperating with a device communication port of a personal media device selected from a diverse assortment of personal media devices having different connection requirements, said communication ports being disposed at the user chair and including:
  - a first communication port having a first connection requirement and being concurrently coupled with a predetermined data port and the audio/video port of said audio/video display; and
  - a second communication port having a second connection requirement being different from the first connection requirement and being coupled with the audio/video port of said audio/video display,
- wherein the access point senses whether a preselected communication port is cooperating with the device communication port and enables said preselected communication port to support communication between the sensed personal media device and said audio/video display such that said audio/video display at least one of presents audio/video content received at the audio/video port from the sensed personal media device and responds to data signals exchanged with the sensed personal media device via the predetermined data port, and wherein said preselected communication port comprises a nine-pin mini Deutsches Institut für Normung (DIN) type connector.

27. The access point of claim 26, wherein the access point enables said preselected communication port to support wireless communication between the sensed personal media device and the display.

28. A method for interfacing a diverse assortment of personal media devices having different connection requirements with a display being disposed at a user chair and having at least one data port and an audio/video port, comprising:
- providing a plurality of communication ports for alternatively cooperating with a device communication port of a selected personal media device;
- concurrently coupling a first communication port having a first connection requirement with a first predetermined data port and the audio/video port of the display;
- coupling a second communication port having a second connection requirement being different from the first connection requirement with a second predetermined data port of the display;
- sensing whether a preselected communication port is cooperating with the device communication port;
- enabling said preselected communication port to support communication between the sensed personal media device and the display;
- enabling the display to at least one of present audio/video content received at the audio/video port from the sensed personal media device and respond to data signals exchanged with the sensed personal media device via a relevant data port, and wherein said preselected communication port comprises a nine-pin mini Deutsches Institut für Normung (DIN) type connector.

29. The method of claim 28, further comprising disposing the communication ports at the user chair and performing a plurality of integration tasks for enabling the sensed personal media device to become fully integrated with the display such that the sensed personal media device becomes a seamless part of the display.

30. The method of claim 28, wherein said coupling a first communication port and said coupling a second communication port comprises coupling said first and second communication ports to a common predetermined data port via a hub system.

31. The method of claim 28, further comprising:
- enabling the display to receive preselected content from a content provider;

enabling the display and a user interface of the sensed personal media device to be alternatively selectable for presenting the preselected content; and enabling the display and the user interface of the sensed personal media device to be alternatively selectable for controlling presentation of the preselected content.

32. The method of claim 28, wherein said enabling said preselected communication port to support communication between the sensed personal media device and the display includes enabling said preselected communication port to support wireless communication between the sensed personal media device and the display.

33. A computer program product for interfacing a diverse assortment of personal media devices having different connection requirements with a display being disposed at a user chair and having at least one data port and an audio/video port via a plurality of communication ports for alternatively cooperating with a device communication port of a selected personal media device and including a first communication port having a first connection requirement and being concurrently coupled with a first predetermined data port and the audio/video port of the display and a second communication port having a second connection requirement being different from the first connection requirement and being coupled with a second predetermined data port of the display, the computer program product being encoded on one or more non-transitory machine-readable storage media and comprising:

instruction for sensing whether a preselected communication port is cooperating with the device communication port;

instruction for enabling said preselected communication port to support communication between the sensed personal media device and the display; and instruction for enabling the display to at least one of present audio/video content received at the audio/video port from the sensed personal media device and respond to data signals exchanged with the sensed personal media device via a relevant data port, and wherein said preselected communication port comprises a nine-pin mini Deutsches Institut für Normung (DIN) type connector.

34. The computer program product of claim 33, further comprising instruction for performing a plurality of integration tasks for enabling the coupled personal media device to become fully integrated with the display such that the personal media device becomes a seamless part of the display.

35. The computer program product of claim 33, further comprising instruction for enabling a user interface of the sensed personal media device to control the presentation audio/video content.

36. The computer program product of claim 35, further comprising:

instruction for enabling the display to receive preselected content from a content provider;

instruction for enabling the display and the user interface of the sensed personal media device to be alternatively selectable for presenting the preselected content; and instruction for enabling the display and the user interface of the sensed personal media device to be alternatively selectable for controlling presentation of the preselected content.

37. The computer program product of claim 33, wherein said instruction for enabling said preselected communication port to support communication between the sensed personal media device and the display includes instruction for enabling said preselected communication port to support wireless communication between the sensed personal media device and the display.

38. A user chair, comprising:

a seat;

first and second chair regions being coupled with said seat;

a display being disposed at said first chair region and having at least one data port and an audio/video port; and an access point being disposed at said second chair region and being provided in accordance with claim 1.

39. The user chair of claim 38, wherein first and second chair regions comprise different regions of the user chair and are selected from a group consisting of an armrest, a seatback, and a headrest of the user chair and a predetermined area above the user chair.

* * * * *